(12) United States Patent
Chen et al.

(10) Patent No.: US 12,726,119 B2
(45) Date of Patent: Sep. 1, 2026

(54) POWER SUPPLY UNIT, EMITTING APPARATUS INCLUDING THE SAME, AND CONTROL METHOD

(71) Applicant: Hesai Technology Co., Ltd., Shanghai (CN)

(72) Inventors: Jie Chen, Shanghai (CN); Jingjing Lu, Shanghai (CN); Jinming Tian, Shanghai (CN); Li Li, Shanghai (CN); Shaoqing Xiang, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 796 days.

(21) Appl. No.: 18/091,849

(22) Filed: Dec. 30, 2022

(65) Prior Publication Data

US 2023/0132592 A1 May 4, 2023

Related U.S. Application Data

(63) Continuation of application No. PCT/CN2021/114304, filed on Aug. 24, 2021.

(30) Foreign Application Priority Data

Aug. 24, 2020 (CN) ......................... 202010857698.4
Aug. 24, 2020 (CN) ......................... 202010858924.0

(51) Int. Cl.
*G01S 17/42* (2006.01)
*G01S 7/481* (2006.01)
*H02M 3/155* (2006.01)

(52) U.S. Cl.
CPC .......... *H02M 3/155* (2013.01); *G01S 7/4815* (2013.01); *G01S 17/42* (2013.01)

(58) Field of Classification Search
None
See application file for complete search history.

(56) References Cited

U.S. PATENT DOCUMENTS 3,881,145 A 4/1975 Tanigaki
5,006,721 A 4/1991 Cameron et al.
(Continued)

FOREIGN PATENT DOCUMENTS

CN 2624203 Y 7/2004
CN 102931867 A 2/2013
(Continued)

OTHER PUBLICATIONS

Patent Cooperation Treaty, International Search Report, International Application No. PCT/CN2021/114304 (Nov. 23, 2021).
(Continued)

*Primary Examiner* — Hovhannes Baghdasaryan
(74) *Attorney, Agent, or Firm* — Leydig, Voit & Mayer, Ltd.

(57) ABSTRACT

A detection method (100) of a lidar (200), the lidar (200), and a system for a vehicle (300) including the same. The lidar (200) is capable of rotating around a rotating shaft, and includes an emitting unit (210) having a plurality of laser emitters (211). The detection method (100) includes: step S101, controlling the plurality of laser emitters (211) to emit laser beams for detection so that the lidar (200) has a non-uniform angular resolution along a horizontal direction; step S102, receiving echoes of the emitted laser beams for detection reflected by a target object and converting the echoes into electrical signals; and step S103, calculating a distance and/or reflectivity of the target object according to the electrical signals. Thereby, an angular resolution along a horizontal direction of the lidar (200) is flexibly configured,
(Continued)

flight time and power consumption are reduced, and a detection range of the lidar (200) is improved.

24 Claims, 21 Drawing Sheets

(56) References Cited

U.S. PATENT DOCUMENTS

| | | | |
|---|---|---|---|
| 2018/0301589 | A1 | 10/2018 | Burroughs et al. |
| 2018/0323576 | A1 | 11/2018 | Crawford et al. |
| 2020/0178361 | A1 | 6/2020 | Oka |
| 2020/0219702 | A1 | 7/2020 | Prager et al. |

FOREIGN PATENT DOCUMENTS

| | | | | |
|---|---|---|---|---|
| CN | 107807353 | A | 3/2018 | |
| CN | 108631151 | A | 10/2018 | |
| CN | 108711907 | A | 10/2018 | |
| CN | 109031249 | A | 12/2018 | |
| CN | 109143260 | A | 1/2019 | |
| CN | 109728501 | A | 5/2019 | |
| CN | 109959942 | A | 7/2019 | |
| CN | 110212405 | A | 9/2019 | |
| CN | 209389446 | U | 9/2019 | |
| CN | 110535028 | A | 12/2019 | |
| CN | 111244752 | A | 6/2020 | |
| CN | 112782668 | A | 5/2021 | |
| CN | 112782673 | A | 5/2021 | |
| EP | 0720027 | A2 | 7/1996 | |
| WO | WO-2021088313 | A1 * | 5/2021 | ............ G01S 17/42 |

OTHER PUBLICATIONS

Patent Cooperation Treaty, Written Opinion of the International Searching Authority, International Application No. PCT/CN2021/114304 (Nov. 23, 2021).

Li Ruolan, "Longitudinal flow CO_2 laser excitation power supply," Industry and Technology Forum, Issue 20 (with English abstract) (Oct. 30, 2016).

Zhang Wei et al., "Ion source high-voltage pulse power supply based on pulse frequency regulation mechanism," Technology Wind, Issue 23 (Aug. 20, 2020).

* cited by examiner

GaN
Driving of GaN
Capacitor C on HV1 bus
Pad of laser emitter
Capacitor C on HV2 bus
First layer of wiring
Pad of anode of laser emitter
Second layer of wiring
Gold wire of anode of laser emitter
Via
Third layer of wiring

POWER SUPPLY UNIT, EMITTING APPARATUS INCLUDING THE SAME, AND CONTROL METHOD

CROSS-REFERENCE TO RELATED APPLICATIONS

This patent application is a continuation of International Application No. PCT/CN2021/114304, filed Aug. 24, 2021. This patent application claims foreign priority to Chinese Patent Application No. 202010858924.0, filed Aug. 24, 2020 and Chinese Patent Application No. 202010857698.4, filed on Aug. 24, 2020. Herein which is incorporated by reference.

TECHNICAL FIELD

The present disclosure generally relates to the field of lidar technologies, and in particular, to a power supply unit for a laser emitter, an emitting apparatus including the same, and a method for controlling a laser emitter to emit light by using the same.

BACKGROUND OF THE INVENTION

In a lidar emitting system, a manner of a common anode is usually used to drive laser emitters. For example, as shown in FIG. 1A, in the lidar emitting system in the prior art, a plurality of laser emitters LAS1-LASN share a common power supply HV that supplies power continuously. A cathode of each laser emitter is respectively connected to a switching device (J1-JN as shown in the figure), and light emission of the laser emitter is determined by activating of the switching device. Ideally, each laser emitter is equipped with a discharge capacitor (C1-CN as shown in the figure). Limited by the sizes of the switching device and the capacitor in the prior art, the plurality of laser emitters cannot be arranged more densely, which limits vertical resolution of the lidar.

FIG. 1B shows a power supply and a driving circuit of a single laser emitter LAS1. The switching device used in the driving circuit is GaN. A specific operating process is as follows: When a high-side switch is closed (conducted), the power supply HV charges a capacitor C; after a period of time, the high-side switch is disconnected (power cannot be turned on, and a charging loop of the capacitor C is disconnected). After a driving signal for the GaN switch is sufficient to open the GaN switch, a discharging loop is formed between the capacitor C, the laser emitter LAS1, the GaN switch and the ground, which makes the laser emitter LAS1 emit light.

FIG. 2A shows a relative arrangement relationship of a plurality of laser emitters, GaN switching devices, and capacitors on a printed circuit board (PCB). As shown in FIG. 2A, due to the limitation of the GaN switching size and the capacitor size (The GaN switch and the capacitor are relatively large. For example, in an actual packaging process, when selecting discharge capacitor, it is necessary to consider parameters such as capacitance value and capacitance withstand voltage, so the available capacitance is 0402 (EIA nominal), and its size is 1000 um*500 um, in addition, considering an SMT (surface mounting technology) process, the packaging size is generally recommended to be 1400 um*900 um; When selecting GaN switching device, considering the withstand voltage and co-current capability, the minimum size that can be achieved by the conventional process is about 680 um*680 um, and considering the SMT process, the packaging size is generally recommended to be 800 um*800 um.), the capacitor and the GaN switch can only be arranged separately on both sides of the laser emitter. And in order to meet the requirement of one GaN switch driving one laser emitter (that is, a ratio of a quantity of the laser emitters to a quantity of the GaN switching devices is 1:1), the GaN switches also need to be arranged in two rows and staggered.

The arrangement of FIG. 2A is simplified as shown in FIG. 2B. Referring to FIG. 2A and FIG. 2B, it can be seen that a distance between the laser emitter LAS2 and the corresponding GaN switch is greater than a distance between the laser emitter LAS1 and the corresponding GaN switch. Staggered placement of the GaN switches leads to different lengths of discharging loops between every two laser emitters (such as LAS1 and LAS2), which may result in different emission power between every two laser emitters. There is a certain distance between the GaN switch and the laser emitter, which also affects a response speed of the laser emitter.

The lidars used for unmanned vehicles, logistics vehicles, and sweeping robots are usually multi-line radars, which means that the emitting system has a plurality of laser emitters. If the laser emitters are arranged according to the relative relationship shown in FIG. 2A and FIG. 2B, the distance between laser emitter and its corresponding GaN switch is relatively inconsistent with each other, resulting in different parameters such as detection accuracy of each channel or line, which is not conducive to the consistency of detection, further affecting overall performance of the lidar.

In addition, as shown in FIG. 1A, the power supply HV supplies power to the line at a fixed value (for example, HV=20 V) and cannot be adjusted quickly. The reason is that if an adjustment speed of the power supply is excessively fast, various capacitance and inductance effects on the line accumulate and the adjustment speed will not be changed as expected. In addition, since the current high-voltage power supply usually uses a DC-DC power supply or a low dropout regulator (LDO) with a slow switching speed, which also leads to light intensity of the laser emitter failing to be adjusted quickly. However, an external environment faced by the lidar is changeable. If a same fixed light intensity is used for detection, due to the difference in reflectivity of an external targets, it is easy to cause a detector to saturate or fail to detect signal, which cannot meet the needs of various scenarios. Detection indicators, such as a detection distances, of each lines of the lidar may also be different, and there is also a need for adjustment.

The content of the background is merely technologies known to the public, and does not represent conventional technologies in the field.

BRIEF SUMMARY OF THE INVENTION

To resolve the problem in the prior art that an adjustment of bus voltage is slow and cannot be changed as expected, that is, high-speed change cannot be achieved, which further causes that light intensity of a laser emitter cannot be adjusted quickly, the present disclosure further provides a power supply unit for a laser emitter, including:

- a preparatory voltage source, configured to output a preparatory voltage;
- a high-voltage generation unit, coupled to the preparatory voltage source, configured to receive the preparatory voltage, generate an output voltage higher than the preparatory voltage, and output the output voltage via an output end; and a capacitor unit, coupled to the output end of the high-voltage generation unit, where the high-voltage generation unit and the capacitor unit are configured to cooperatively adjust the output voltage through charge and discharge processes.

According to an aspect of the present disclosure, the high-voltage generation unit includes:

a first inductor, a first end of which is coupled to the preparatory voltage source, configured to receive electrical energy from the preparatory voltage source;

a first switch having a first end coupled to a second end of the first inductor and a second end connected to ground, the first switch configured to, upon switching to a connected state, connect the voltage source and the first inductor to form a charging loop, and cause the first inductor to be charged; and a second switch having a first end coupled to the second end of the first inductor and a second end coupled to the capacitor unit as the output end of the high-voltage generation unit.

According to an aspect of the present disclosure, the power supply unit further includes a reset switch, where the reset switch is connected between the preparatory voltage source and the capacitor unit and configured to reduce the output voltage back to the preparatory voltage.

According to an aspect of the present disclosure, the first switch, the second switch, and the reset switch include one or more of a GaN switch and a CMOS switch.

The present disclosure further provides an emitting apparatus for a lidar, including:

a plurality of power supply units as described above, configured to convert preparatory voltages into high voltages to output;

a laser emitter unit, including a plurality of laser emitters, where one end of each laser emitter is connected to an output end of one of the power supply units, so that at least two laser emitters are connected to the output ends of different power supply units; and at least one switching device, where cathodes of laser emitters that do not share a common high voltage are connected to one of the at least one switching devices, and the one of the at least one switching device is configured to selectively control a connection state of a current loop formed by one of the high voltages, the laser emitters connected thereto, and the ground.

The present disclosure further provides a control unit for controlling the power supply unit as described above, where the high-voltage generation unit includes a first switch, a second switch, and a reset switch, and the control unit includes:

generating a voltage control signal according to a time sequence of emission of a laser emitter, and outputting the voltage control signal to control electrodes of the first switch, the second switch, and the reset switch respectively, to control the high-voltage generation unit to output an output voltage higher than the preparatory voltage, and control the capacitor unit and the high-voltage generation unit to cooperatively adjust the output voltage through charge and discharge processes.

The present disclosure further provides a method for controlling a laser emitter to emit light by using the power supply unit as described above, including:

outputting the preparatory voltage by the preparatory voltage source;

generating the output voltage higher than the preparatory voltage through the high-voltage generation unit; and cooperatively adjusting the output voltage through charge and discharge processes of a capacitor unit and the high-voltage generation unit.

According to an aspect of the present disclosure, the high-voltage generation unit includes: a first inductor, a first end of which is coupled to the preparatory voltage source, a first switch having a first end coupled to a second end of the first inductor and a second end connected to ground, and a second switch having a first end coupled to the second end of the first inductor and a second end coupled to the capacitor unit, and the method further includes:

receiving electrical energy from the preparatory voltage source through the first inductor;

causing the preparatory voltage source and the first inductor to form a charging loop by closing the first switch and opening the second switch, thus charging the first inductor by the preparatory voltage source; and causing the preparatory voltage source and the first inductor to form a discharging loop by opening the first switch and closing the second switch, thus charging the capacitor unit by the preparatory voltage source and the first inductor which causes the output voltage to be higher than the preparatory voltage.

According to an aspect of the present disclosure, the method further includes:

by opening the first switch and closing the second switch, causing the capacitor unit to discharge, and causing the first inductor to receive electrical energy from the capacitor unit, which reduces the output voltage.

According to an aspect of the present disclosure, the power supply unit further includes a reset switch, the reset switch is connected between the preparatory voltage source and the capacitor unit, and the method further includes:

reducing the output voltage back to the preparatory voltage through the reset switch.

The present disclosure provides an emitting apparatus for a lidar, including:

a plurality of power supply units, configured to receive a preparatory voltage and output a high voltage, and at least two power supply units output the high voltage at different times respectively, where the high voltage is a voltage higher than the preparatory voltage;

a laser emitter unit, including a plurality of laser emitters, where an anode of each laser emitter is connected to an output end of the power supply unit, which causes at least two of the laser emitters to be connected to different power supply units; and at least one switching device, where cathodes of a subnet of laser emitters that do not share the common high voltage are connected to one of the switching devices, and the switching device is configured to control a connection state of a current loop formed by the corresponding power supply unit, the laser emitter connected thereto, and the ground.

The present disclosure further provides a method for controlling the emitting apparatus as described above to emit light, including:

controlling a power supply unit to output a voltage; and controlling a current loop of a subset of laser emitters to be connected through the switching device, which causes a laser emitter connected to the power supply unit of the output voltage to emit light by the effect of the voltage.

The present disclosure further provides a lidar, including the emitting apparatus as described above, a receiving apparatus, and a control apparatus, where the emitting apparatus is suitable for driving laser emitters to emit a detection laser beam according to a certain time sequence under the control of the control apparatus;

the receiving apparatus is suitable for receiving an echo reflected by an external obstacle relative to the lidar; and the control apparatus is suitable for generating a voltage control signal according to a detection demand of the lidar, controlling a power supply unit to output a voltage, and generating a driving signal to activate a subnet of the laser emitters to emit light; and is suitable for processing the echo received by the receiving apparatus, and calculating a distance and/or reflectivity between the external obstacle and the lidar according to the echo signal.

An exemplary embodiment of the present disclosure provides an emitting apparatus for a lidar. A plurality of power supply units that share a preparatory voltage source are used to activate laser emitters connected to the power supply units to emit light, a plurality of laser emitters that do not share a voltage can be individually and one by one activated for a certain laser emitter or a certain row or a certain column of laser emitters by sharing a GaN switching device, which reduces cost and volume of an emitting end, and makes the size of the GaN switching device no longer the limit of vertical angular resolution of the lidar. The GaN switching device can be arranged at both sides of the plurality of laser emitters, or use a wiring method of PCB back wiring, which causes emitting power and various parameters of the plurality of laser emitters to tend to be consistent, thereby improving performance of the lidar. In addition, by interlacing the plurality of laser emitters, the angular resolution in the vertical direction is also increased.

An exemplary embodiment of the present disclosure provides a power supply unit including an LC resonant circuit. Due to the characteristics of the LC resonant circuit, a charge-discharge speed of the power supply unit for a mounted capacitor is greatly improved. Compared with a solution of a feedback circuit used in the prior art, the speed is increased by a thousand times, which can adjust light intensity of a plurality of laser emitters of the lidar relatively faster, to match with an external obstacle situation or a scenario of use, thereby improving accuracy of point cloud detection.

BRIEF DESCRIPTION OF THE SEVERAL VIEWS OF THE DRAWING(S)

The accompanying drawings are used to provide a further understanding of the present disclosure, and form a part of the specification, are used to explain the present disclosure in combination with the embodiments of the present disclosure, and do not form a limitation to the present disclosure. In the accompanying drawings:

FIG. 1A schematically shows an emitting apparatus for a lidar under a single-bus power supply system;

FIG. 1B schematically shows a circuit structure in which one GaN switching device drives one laser emitter;

FIG. 2A schematically shows an arrangement of components on a PCB under a single-bus power supply system;

FIG. 2B schematically shows an arrangement of components on a PCB under a single-bus power supply system;

FIG. 3 schematically shows an emitting apparatus according to an exemplary embodiment of the present disclosure;

FIG. 4A schematically shows an emitting apparatus according to an exemplary embodiment of the present disclosure;

FIG. 4B schematically shows a specific implementation structure of a three-bus emitting apparatus according to an embodiment of the present disclosure;

FIG. 4C shows a waveform of an output voltage according to the exemplary embodiment shown in FIG. 4B;

FIG. 4D schematically shows a specific implementation structure of a two-bus emitting apparatus according to an embodiment of the present disclosure;

FIG. 4E shows a waveform of an output voltage according to the exemplary embodiment shown in FIG. 4D;

FIG. 5 schematically shows an arrangement of components on a PCB under a two-bus power supply system according to an exemplary embodiment of the present disclosure;

FIG. 6 schematically shows a wiring method of components on a PCB under a two-bus power supply system according to an exemplary embodiment of the present disclosure;

FIG. 7 schematically shows an arrangement of components on a PCB under a four-bus power supply system according to an exemplary embodiment of the present disclosure;

FIG. 8 schematically shows a power supply unit for a laser emitter according to an exemplary embodiment of the present disclosure;

FIG. 9A schematically shows a specific implementation structure of a power supply unit;

FIG. 9B schematically shows a simulation curve of operating of the power supply unit in FIG. 9A;

FIG. 9C schematically shows a specific implementation structure of a power supply unit according to an exemplary embodiment of the present disclosure;

FIG. 10A schematically shows a first charge process of a high-voltage generation unit according to an exemplary embodiment of the present disclosure;

FIG. 10B shows change curves of a first inductor and an output voltage of a power supply unit according to an exemplary embodiment of the present disclosure;

FIG. 11A schematically shows a second charge process of a high-voltage generation unit according to an exemplary embodiment of the present disclosure;

FIG. 11B shows change curves of a first inductor and an output voltage of a power supply unit according to an exemplary embodiment of the present disclosure;

FIG. 12A schematically shows a first discharge process of a high-voltage generation unit according to an exemplary embodiment of the present disclosure;

FIG. 12B shows change curves of a first inductor and an output voltage of a power supply unit according to an exemplary embodiment of the present disclosure;

FIG. 13A schematically shows a second discharge process of a high-voltage generation unit according to an exemplary embodiment of the present disclosure;

FIG. 13B shows change curves of a first inductor and an output voltage of a power supply unit according to an exemplary embodiment of the present disclosure;

FIG. 14A schematically shows a reset process of a high-voltage generation unit according to an exemplary embodiment of the present disclosure;

Figure 16:
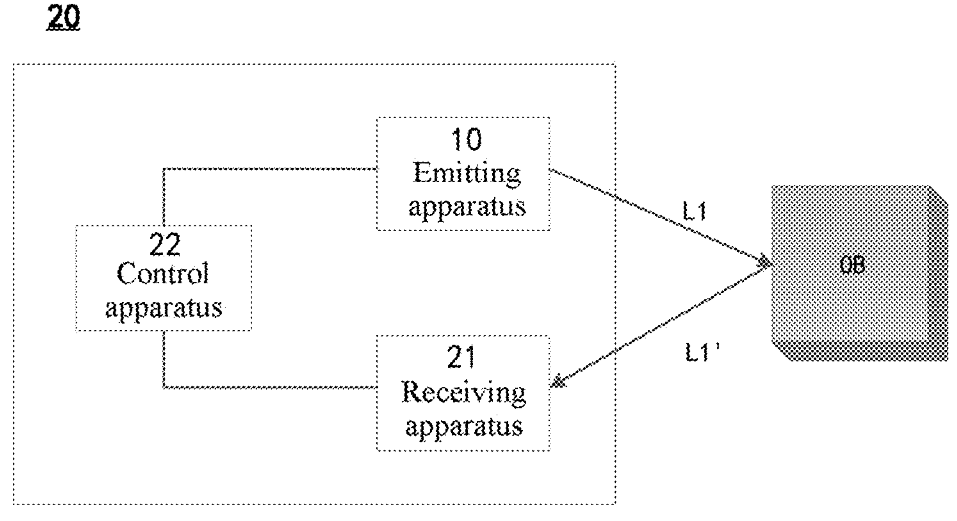
Figure 17:
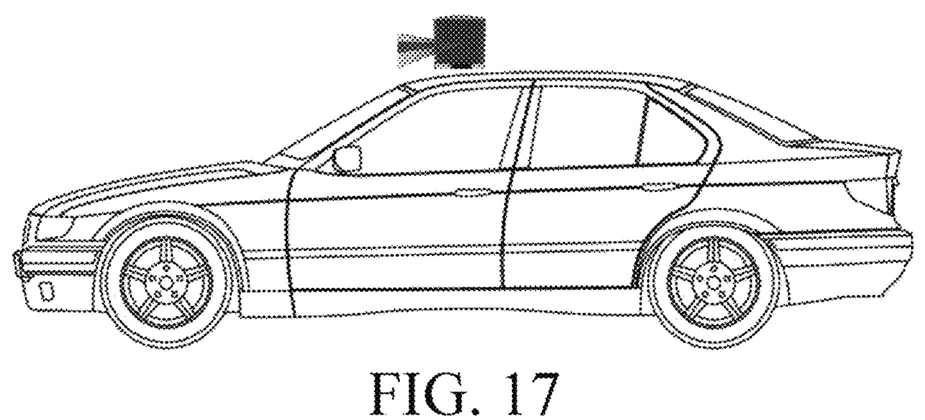
Figure 18:
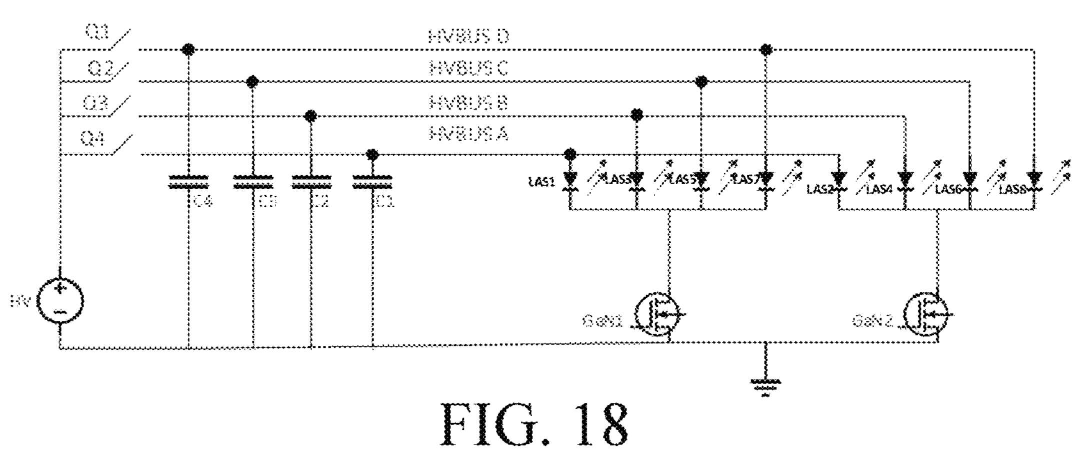
Figure 19:
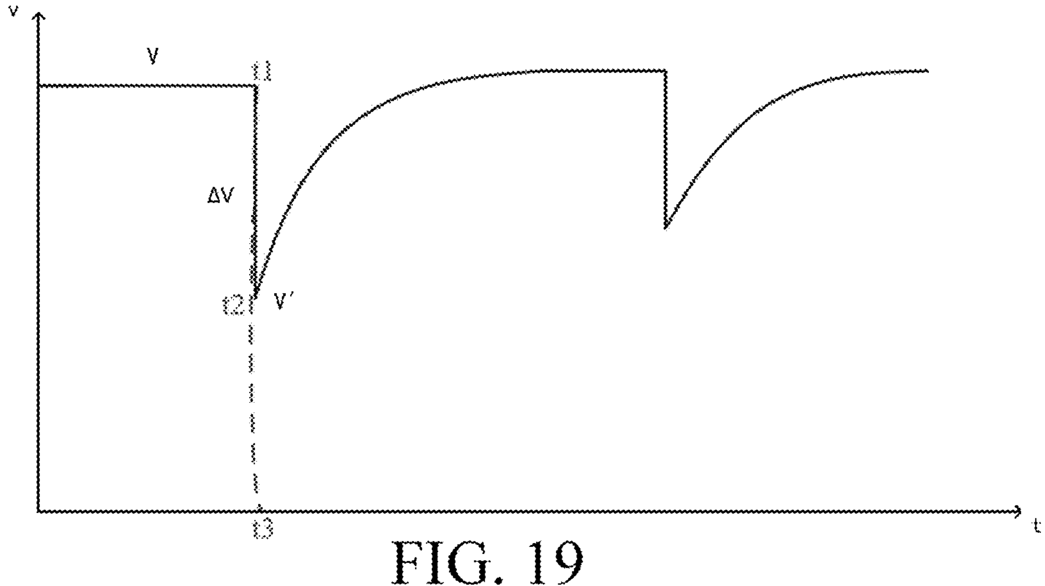
Figure 20:
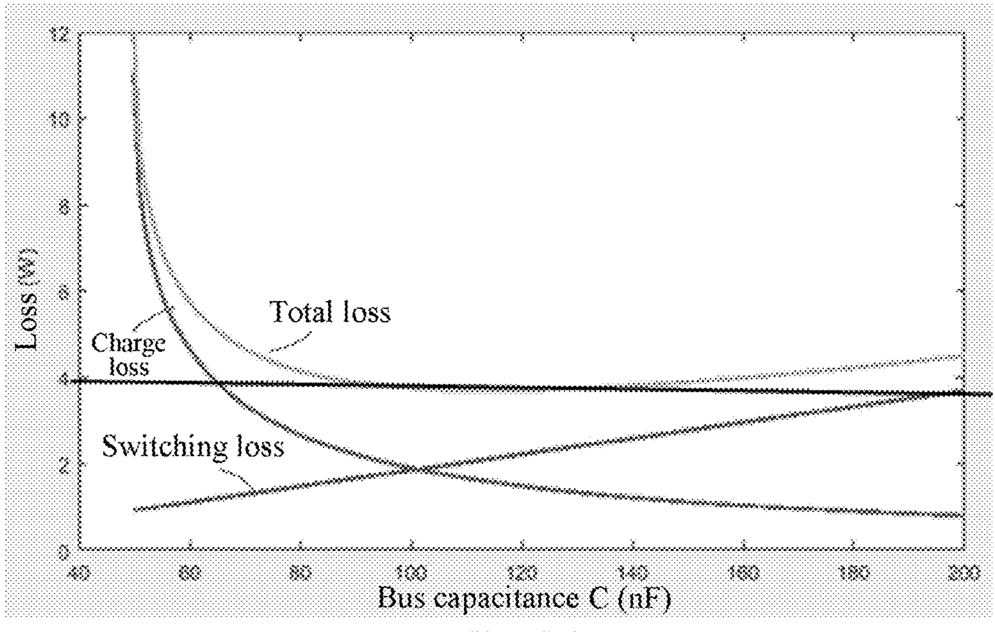
Figure 21:
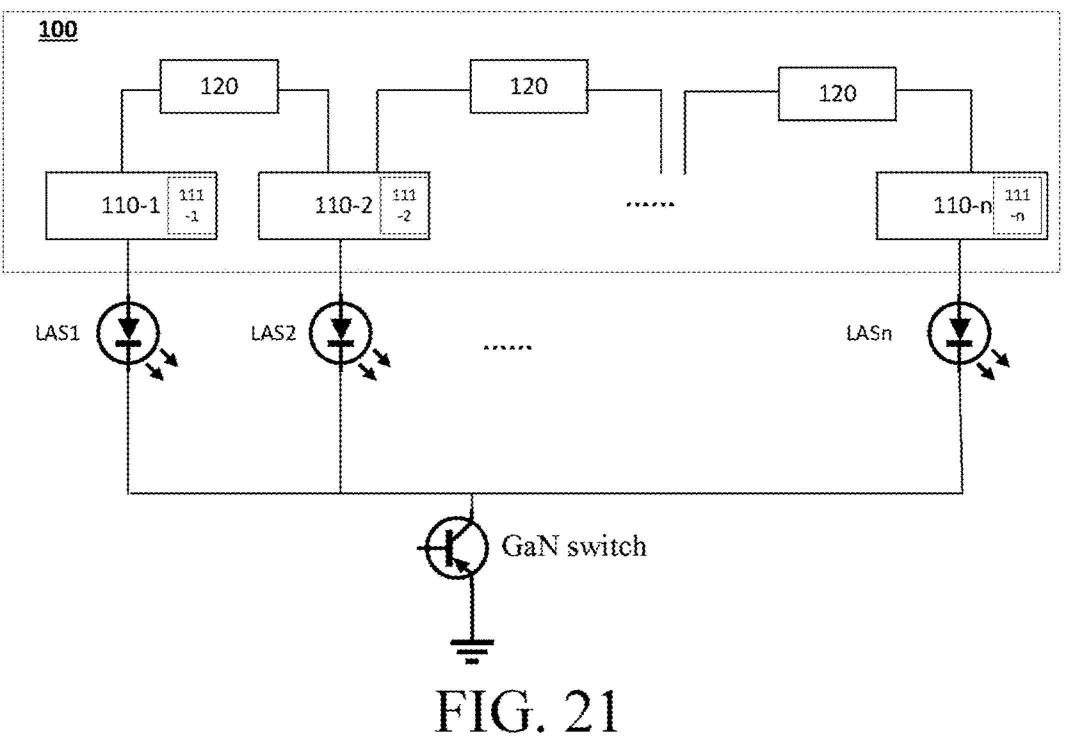
Figure 22:
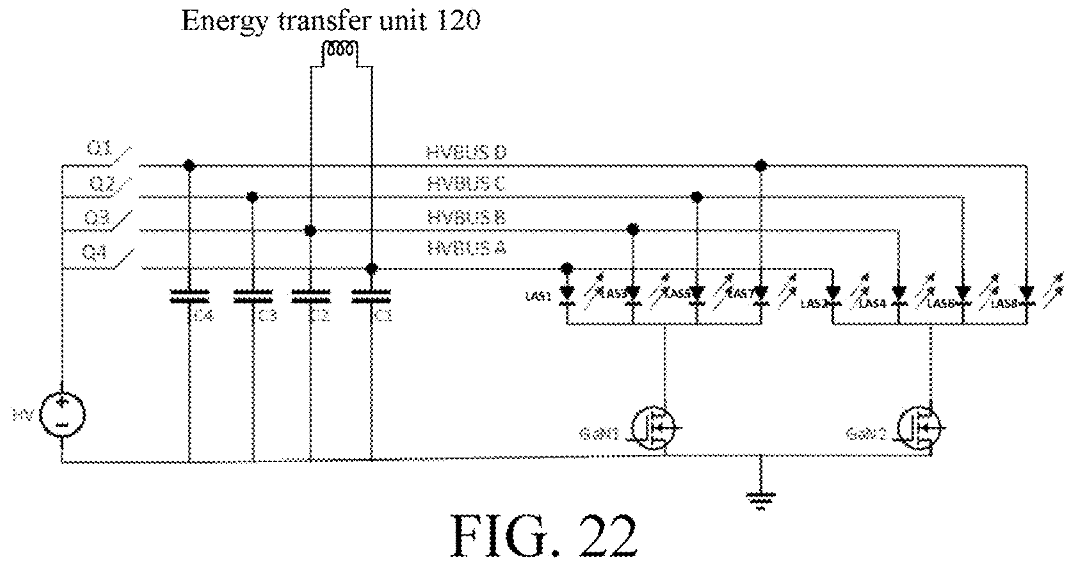
Figure 23:
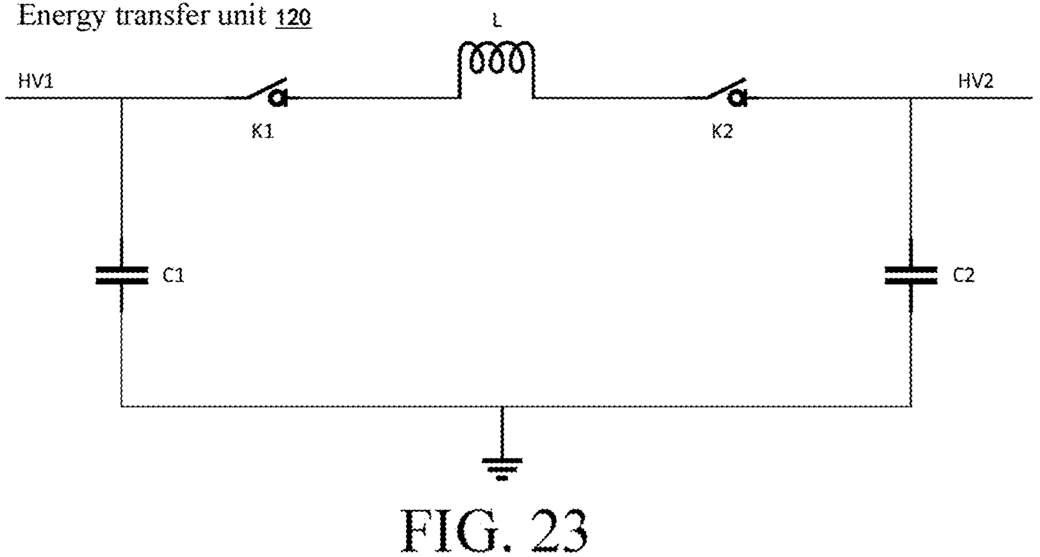
Figure 24:
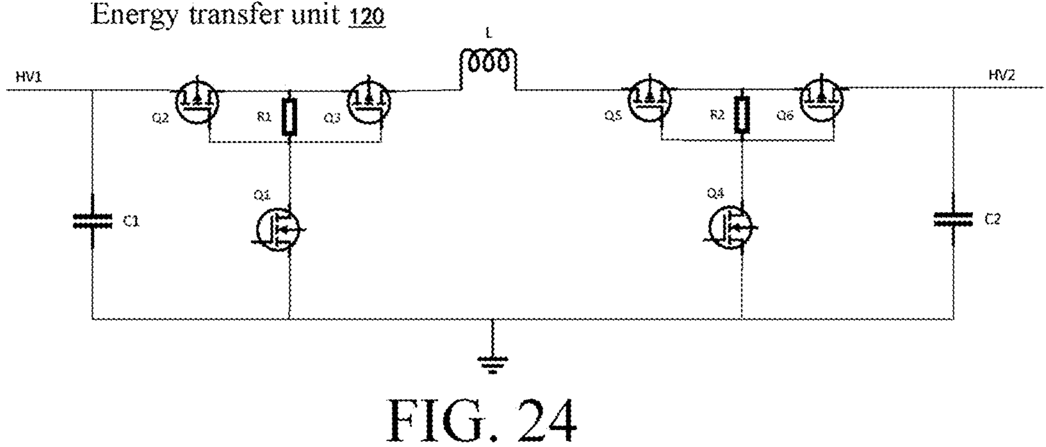
Figure 25:
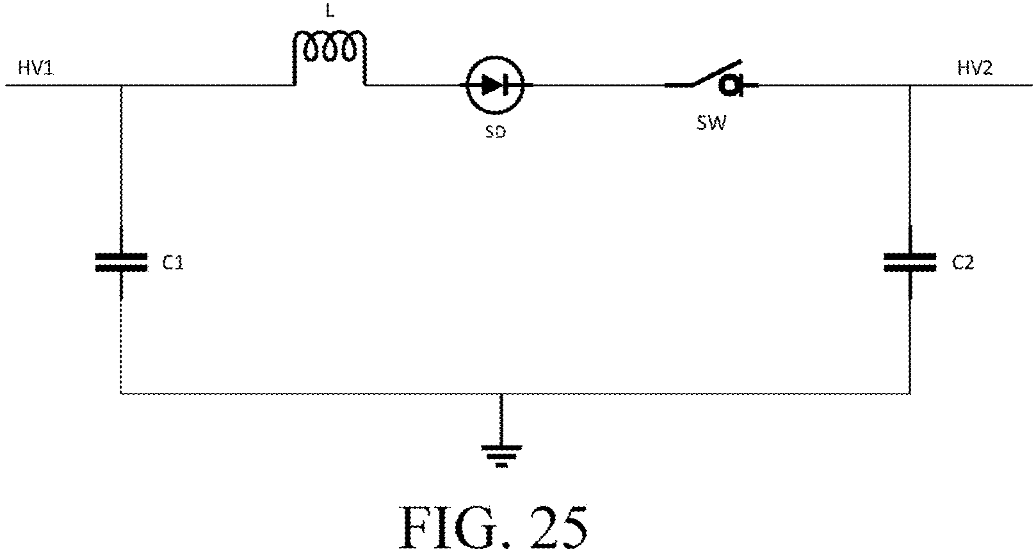
Figure 26:
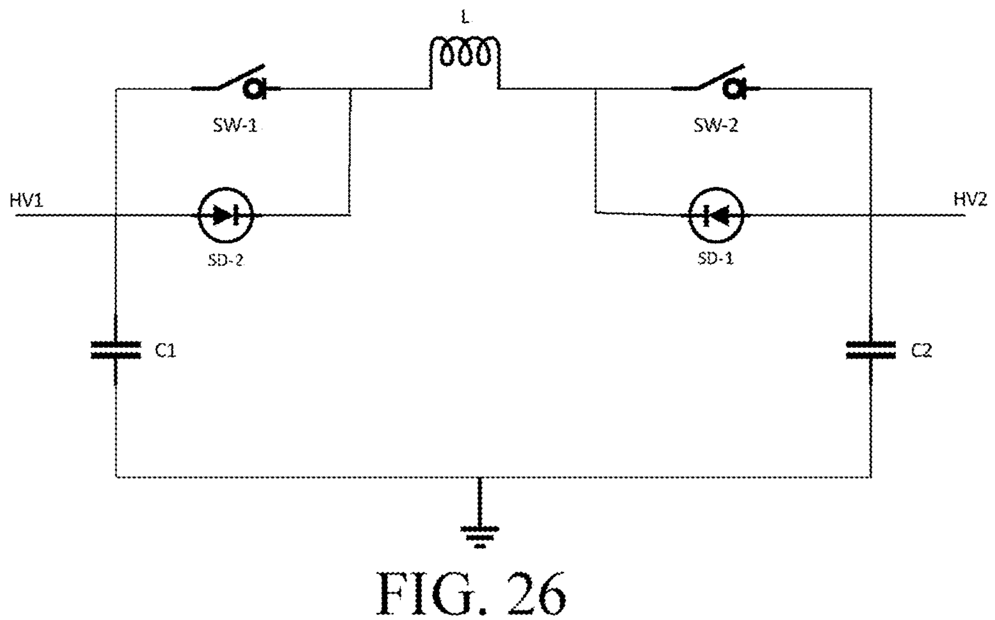
Figure 27:
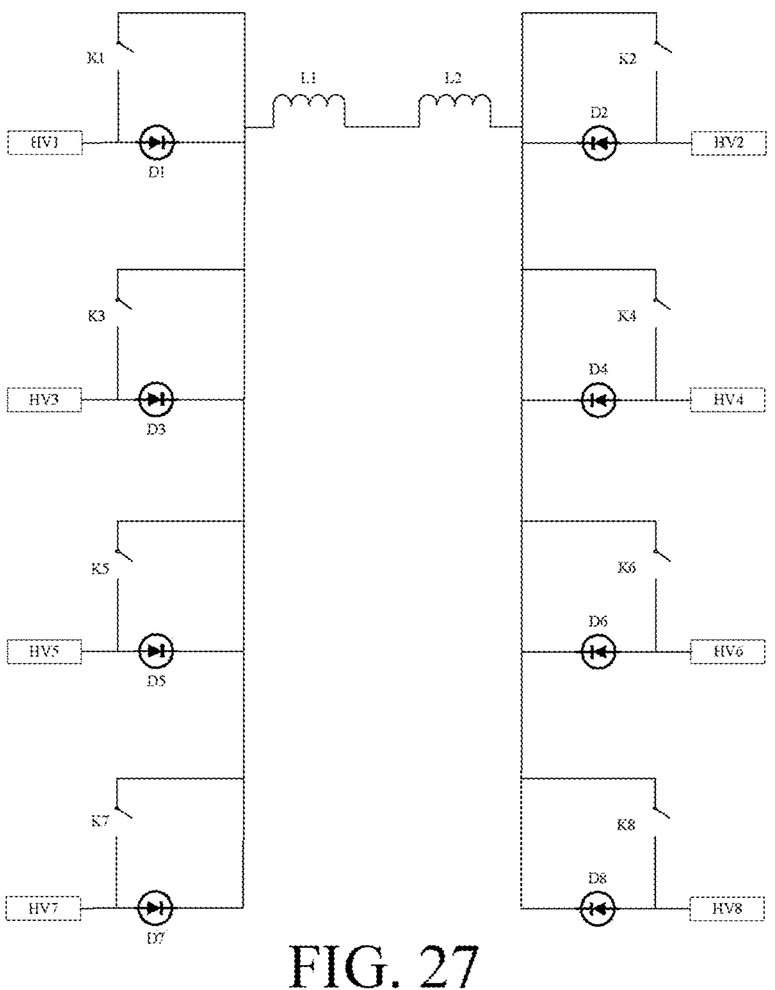

FIG. 16 schematically shows a lidar according to an exemplary embodiment of the present disclosure;

FIG. 17 schematically shows an application scenario of a lidar according to an exemplary embodiment of the present disclosure;

FIG. 18 shows a four-bus driving apparatus for a lidar;

FIG. 19 shows a charge-discharge curve of a capacitor of a multi-bus driving apparatus in an operating process;

FIG. 20 shows a switching loss, a charge loss, and a total loss of a multi-bus driving apparatus in an operating process;

FIG. 21 shows a multi-bus driving apparatus for a lidar according to an embodiment of the present disclosure;

FIG. 22 shows a four-bus driving apparatus for a lidar according to an embodiment of the present disclosure;

FIG. 23 shows an energy transfer unit of a multi-bus driving apparatus according to an embodiment of the present disclosure;

FIG. 24 shows an energy transfer unit of a multi-bus driving apparatus according to an embodiment of the present disclosure;

FIG. 25 shows an energy transfer unit of a multi-bus driving apparatus according to an embodiment of the present disclosure;

FIG. 26 shows an energy transfer unit of a multi-bus driving apparatus according to an embodiment of the present disclosure; and FIG. 27 shows an eight-bus driving apparatus and an energy transfer unit thereof according to an embodiment of the present disclosure.

DETAILED DESCRIPTION OF THE INVENTION

Only some exemplary embodiments are briefly described below. As a person skilled in the art may understand, the described embodiments may be modified in various different ways without departing from the spirit or the scope of the present disclosure. Therefore, the accompanying drawings and the description are to be considered as illustrative in nature but not restrictive.

In the description of the present disclosure, it should be understood that directions or location relationships indicated by terms "center", "longitudinal", "landscape", "length", "width", "thickness", "upper", "lower", "front", "rear", "left", "right", "vertical", "horizontal", "top", "bottom", "inner", "outer", "clockwise", and "counterclockwise" are directions or location relationships shown based on the accompanying drawings, are merely used for the convenience of describing the present disclosure and simplifying the description, but are not used to indicate or imply that an apparatus or an element needs to have a particular direction or be constructed and operated in a particular direction, and therefore, cannot be understood as a limitation to the present disclosure. In addition, terms "first" and "second" are only used to describe the objective and cannot be understood as indicating or implying relative importance or implying a quantity of the indicated technical features. Therefore, a feature restricted by "first" or "second" may explicitly indicate or implicitly include one or more such features. In the descriptions of the present disclosure, unless otherwise explicitly specified, "a plurality of" means two or more than two.

In the descriptions of the present disclosure, it should be noted that, unless otherwise explicitly specified or defined, the terms such as "install", "connect", and "connection" should be understood in a broad sense. For example, the connection may be a fixed connection, a detachable connection, or an integral connection; or, the connection may be a mechanical connection, an electrical connection, or mutual communication; or, the connection may be a direct connection, an indirect connection through an intermediate, or internal communication between two elements or an interaction relationship between two elements. A person of ordinary skill in the art may understand the specific meanings of the foregoing terms in the present disclosure according to specific situations.

In the present disclosure, unless otherwise explicitly specified or defined, that a first feature is "on" or "under" a second feature may include that the first and second features are in direct contact, or may include that the first and second features are not in direct contact but in contact by using other features there between. In addition, that the first feature is "on", "above", or "over" the second feature includes that the first feature is right above and on the inclined top of the second feature or merely indicates that a level of the first feature is higher than that of the second feature. That the first feature is "below", "under", or "beneath" the second feature includes that the first feature is right below and at the inclined bottom of the second feature or merely indicates that a level of the first feature is lower than that of the second feature.

Many different implementations or examples are provided in the following disclosure to implement different structures of the present disclosure. To simplify the disclosure of the present disclosure, components and arrangements in particular examples are described below. Certainly, they are merely examples and are not intended to limit the present disclosure. In addition, in the present disclosure, reference numerals and/or reference letters may be repeated in different examples. The repetition is for the purposes of simplification and clearness, and does not indicate a relationship between various implementations and/or arrangements discussed. Moreover, the present disclosure provides examples of various particular processes and materials, but a person of ordinary skill in the art may be aware of application of another process and/or use of another material.

The embodiments of the present disclosure are described below with reference to the accompanying drawings. It should be understood that the embodiments described herein are merely used to illustrate and explain the present disclosure but are not intended to limit the present disclosure.

First Aspect

It is proper to speculate that due to upgrade of a lidar product, the lidar tends to be designed on chip in terms of various aspects such as the difficulty of assembly, cost, and miniaturization. A laser emitter used by a future lidar may be packaged as a chip, and a driving circuit used to drive the laser emitter may also be packaged as a chip. Due to the limitation of the current process, most laser emitters share a cathode. Therefore, the cathodes of a plurality of laser emitters packaged in the chip of the laser emitter are made together, and then connected to ground (GND), so other devices cannot be arranged between the cathode of each laser emitter and the GND. If the driving circuit is arranged between the cathode of the laser emitter and the GND, because the cathodes of the plurality of laser emitters are connected, the plurality of laser emitters need to share a switching device for inputting a driving signal. If the plurality of laser emitters need to be activated to each other separately (for example, a laser emitter 1 may be individually activated, to make the laser emitter 1 emit light, while a laser emitter 2 does not emit light; or, the laser emitter 2 may be individually activated, to make the laser emitter 2 emit light, while the laser emitter 1 does not emit light; it is not necessary to activate the laser emitter 1 and the laser emitter 2 at the same time), one solution is that the switching device can be arranged on the anode of the laser emitter to drive, but this solution requires a high-side switch. To achieve this regulation, the solution is relatively complex. Based on the purpose of implementing that the plurality of laser emitters can be independently activated, and the motivation of saving GaN, this application proposes a technical solution that the plurality of laser emitters are provided with power supplies respectively and no longer share a power supply. The solution of this application is described and introduced in detail below in combination with FIG. 3 to FIG. 17.

Figure 3:
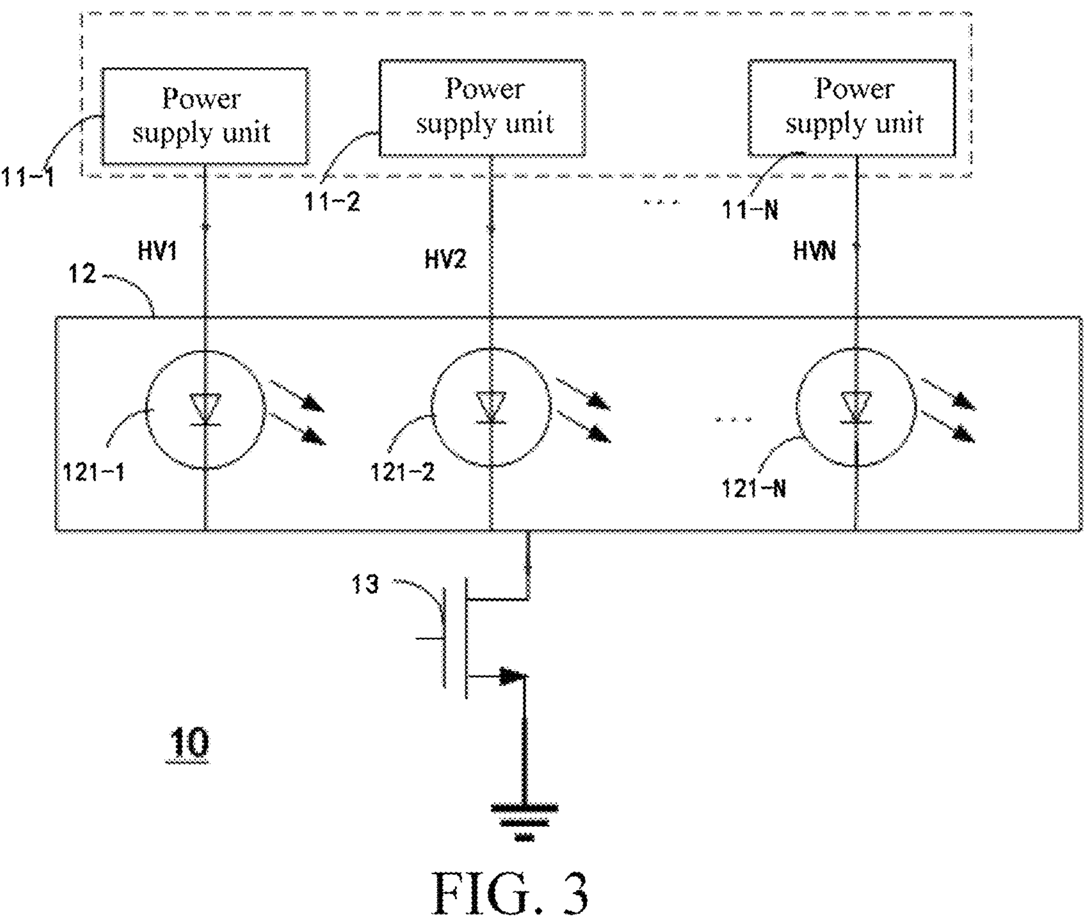

According to an exemplary embodiment of the present disclosure, as shown in FIG. 3, the present disclosure provides an emitting apparatus 10 for a lidar, including a plurality of power supply units 11, such as a power supply unit 11-1, a power supply unit 11-2 to a power supply unit 11-N, a laser emitter unit 12, and at least one switching device 13 shown in the figure.

The plurality of power supply units 11 are configured to convert a preparatory voltage into a high voltage to output (HV1, HV2, . . . , and HVN shown in the figure, the following uses a high voltage HVx to refer to any one of the high voltage HV1, and HV2 to HVN, and the high voltage HVx is a voltage higher than the preparatory voltage), and at least two power supply units 11 output the high voltage at different times. For example, the power supply unit 11-1 may output the high voltage HV1 at a time t1, and the power supply unit 11-2 may output the high voltage HV2 at a time t2, where $t1 \neq t2$.

The laser emitter unit 12 includes a plurality of laser emitters 121, such as a laser emitter 121-1, and a laser emitter 121-2 to a laser emitter 121-N shown in the figure. The laser emitter unit 12 may be a one-dimensional laser emitter or a two-dimensional laser emitter array. Correspondingly, a laser emitter 121-*x* (including the laser emitter 121-1, the laser emitter 121-2, . . . , and the laser emitter 121-N) shown in FIG. 3 may be one laser emitter, one column of laser emitters, or one row of laser emitters. In a connection relationship, the anode of each laser emitter 121-*x* is connected to an output end of the power supply unit 11. At least two laser emitters 121-*x* may be connected to different power supply units 11. For example, the anode of the laser emitter 121-1 is connected to the output end of the power supply unit 11-1, and the anode of the laser emitter 121-2 is connected to the output end of the power supply unit 11-2. There is at least one switching device 13. The cathodes of a subnet of laser emitters that do not share a high voltage (such as the laser emitter 121-2, . . . , and the laser emitter 121-N shown in the figure) are connected to the same switching device 13. The switching device 13 is configured to control a connection state of a discharging loop formed by the corresponding output high voltage HVx, the laser emitter connected to the switching device 13, and the ground (GND). For example, when the power supply unit 11-1 outputs the high voltage HV1 at the time t1, if the switching device 13 is also closed at the time t1, the discharging loop formed by the high voltage HV1, the laser emitter 121-1 connected to the switching device 13, and the ground can be activated.

By using the solution provided in the present disclosure, even if the plurality of laser emitters share the same switching device 13, by at least two power supply units 11 (including the power supply unit 11-1, the power supply unit 11-2, . . . , and the power supply unit 11-N) outputting the high voltage at different times, a subnet of laser emitters 121-*x* in the laser emitter unit 12 (the laser emitter unit 12 includes the laser emitter 121-1, the laser emitter 121-2, . . . , and the laser emitter 121-N) can still be individually activated one by one. It is easy for a person skilled in the art to understand that the laser emitter 121 in the laser emitter unit 12 shown in FIG. 3 is one laser emitter. In another embodiment, the laser emitter 121 may also be one column of a plurality of laser emitters or one row of a plurality of laser emitters, which can overcome the defect of insufficient light intensity of one laser emitter and further improve a long-range measurement capability of the lidar. In addition, different power supply units 11 output different high voltages (such as HV1=20 V, HV2=40 V) to control a subnet of laser emitters 121 in the laser emitter unit 12 to detect with different emission intensity, which also falls within the protection scope of the present disclosure.

Figure 4A:
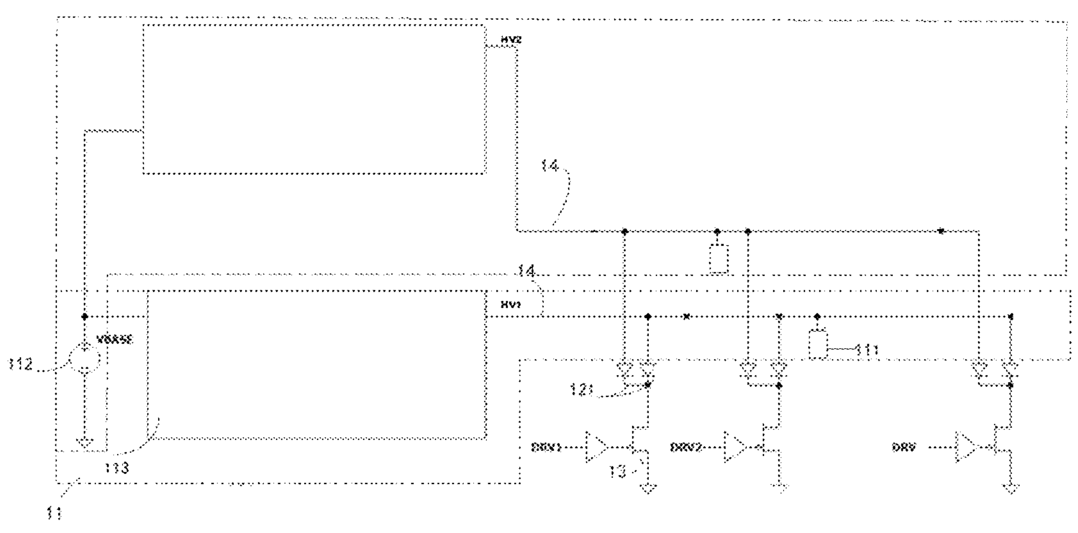

To facilitate understanding, in the present disclosure, the components constituting the power supply unit and the lines connecting the corresponding components are collectively referred to as a voltage bus. A plurality of voltage buses (BUS) connect functional components of the power supply unit 11 together to form a HVBUS. Specifically, one Vbase and one boost circuit together form one power supply unit 11, the output of this power supply unit 11, for the lidar, is to supply the high voltage HV1, thereby forming one voltage bus HVBUS. One Vbase and another boost circuit together form another power supply unit 11, the output of this power supply unit 11, for the lidar, is to supply the high voltage HV2, thereby forming another voltage bus HVBUS. FIG. 4A shows an embodiment of a two-bus power supply system according to the present disclosure. Two buses share one preparatory voltage source 112. Specifically, the emitting apparatus 10 includes a plurality of voltage buses 14 corresponding to the plurality of power supply units 11. An input end of the voltage bus 14 receives a preparatory voltage (i.e. VBASE shown in the figure), and an output end outputs a voltage higher than the preparatory voltage (i.e. HV1 and HV2 shown in the figure). Each laser emitter 121-*x* is connected to the output end of the corresponding power supply unit 11 through one of the voltage buses 14.

It is easy for a person skilled in the art to understand that although FIG. 4A shows a case of two buses, the emitting apparatus 10 includes the plurality of voltage buses 14 which respectively output voltages HV1, and HV2 to HVN higher than the preparatory voltage (VBASE), that is, HVx>VBASE. The plurality of voltage buses 14 may not share the preparatory voltage source 112, which also falls within the protection scope of the present disclosure.

According to an exemplary embodiment of the present disclosure, as shown in FIG. 4A, the power supply unit 11 of the emitting apparatus 10 includes a capacitor unit 111 connected to the voltage bus 14, and the capacitor unit 111 is configured to be charged through the voltage bus 14, and be discharged to one or more laser emitters 121-*x* connected to the voltage bus 14 and activated by the switching device 13 when the switching device 13 is closed, to drive the one or more laser emitters 121-*x* to emit light.

According to an exemplary embodiment of the present disclosure, as shown in FIG. 4A, the power supply unit 11 further includes a preparatory voltage source 112 and a high-voltage generation unit 113. The preparatory voltage source 112 is configured to output a primary voltage (VBASE). The high-voltage generation unit 113 is connected to the preparatory voltage source 112, the preparatory voltage source 112 is suitable for outputting the preparatory voltage (VBASE) to the high-voltage generation unit 113, and the high-voltage generation unit 113 is configured to generate a voltage Hvx higher than the preparatory voltage (VBASE).

Figure 4B:
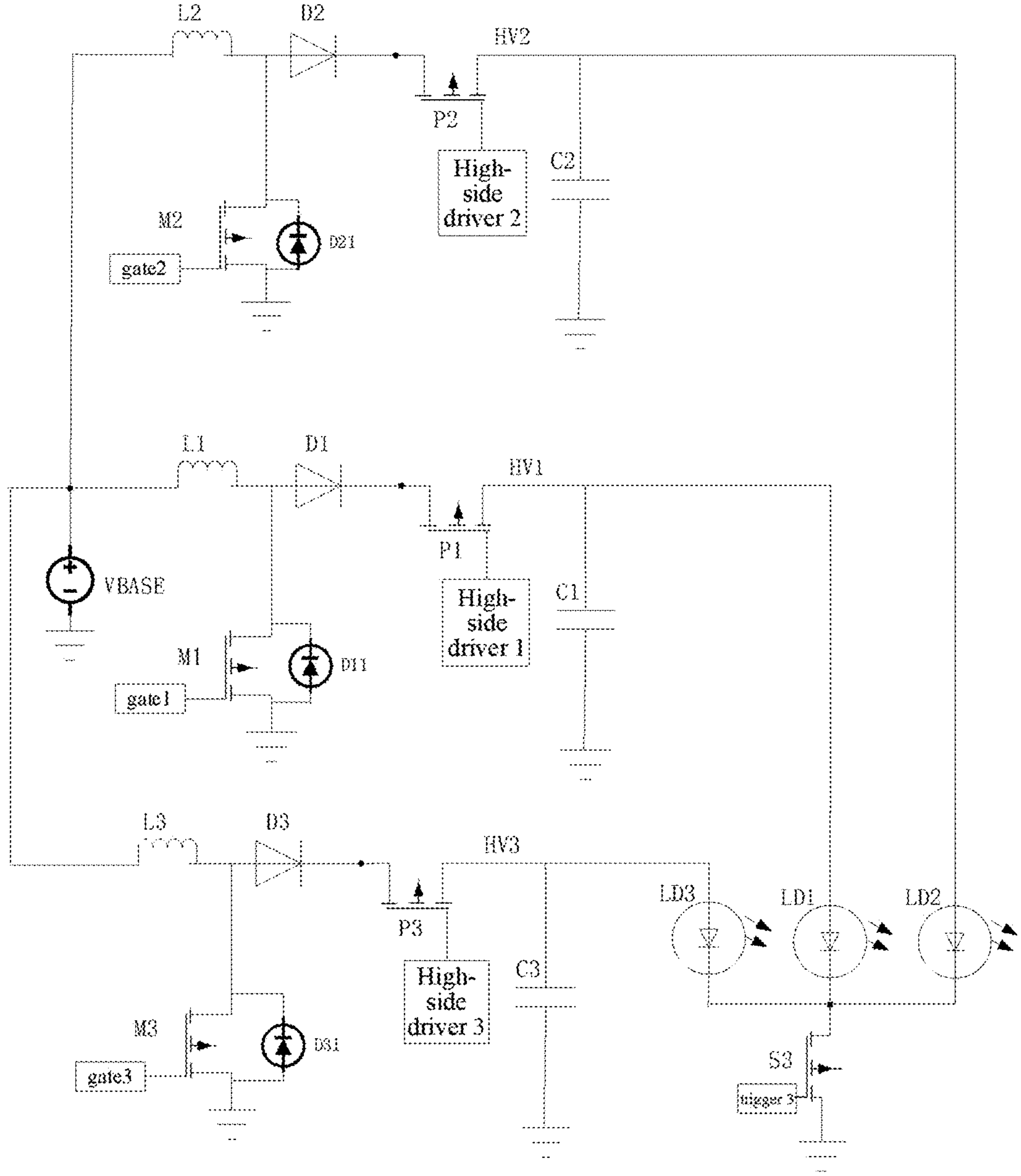
Figure 4C:
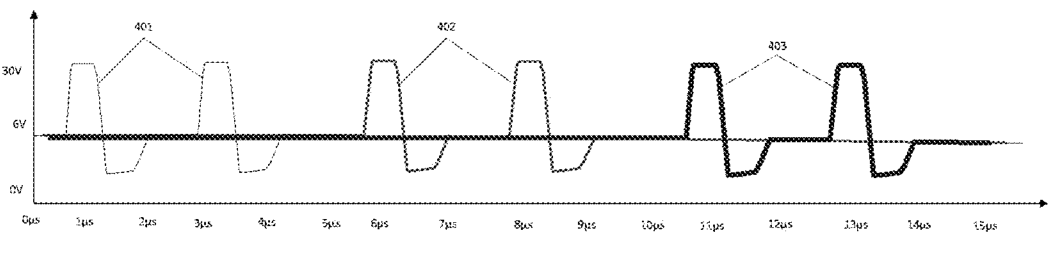
Figure 4D:
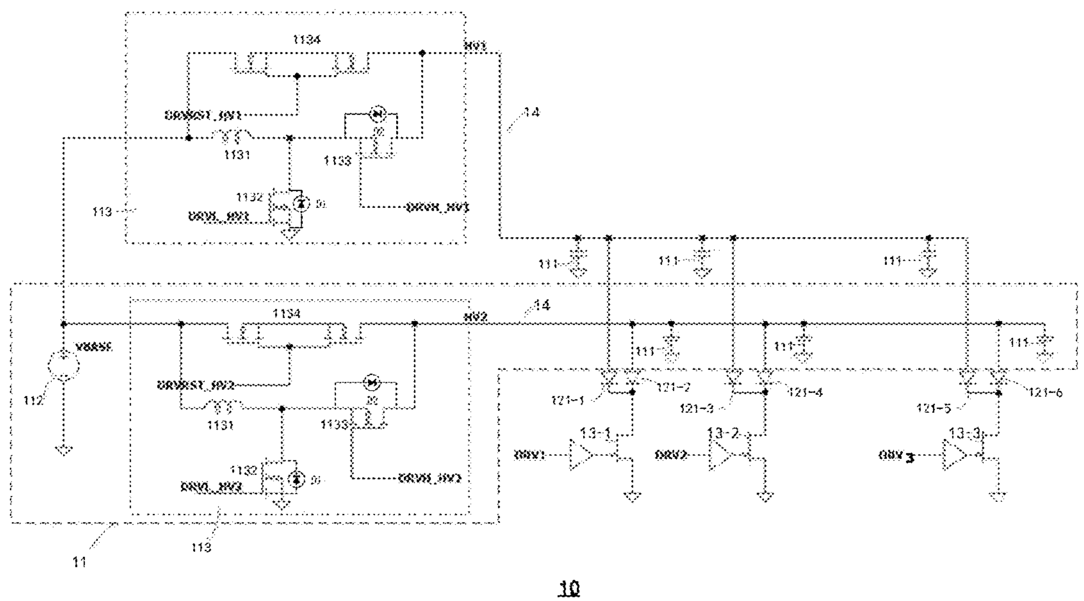
Figure 9A:
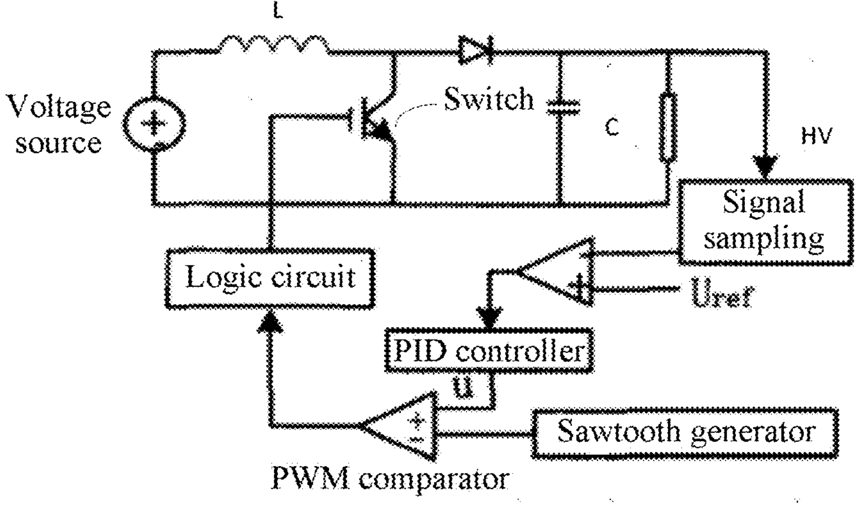
Figure 9B:
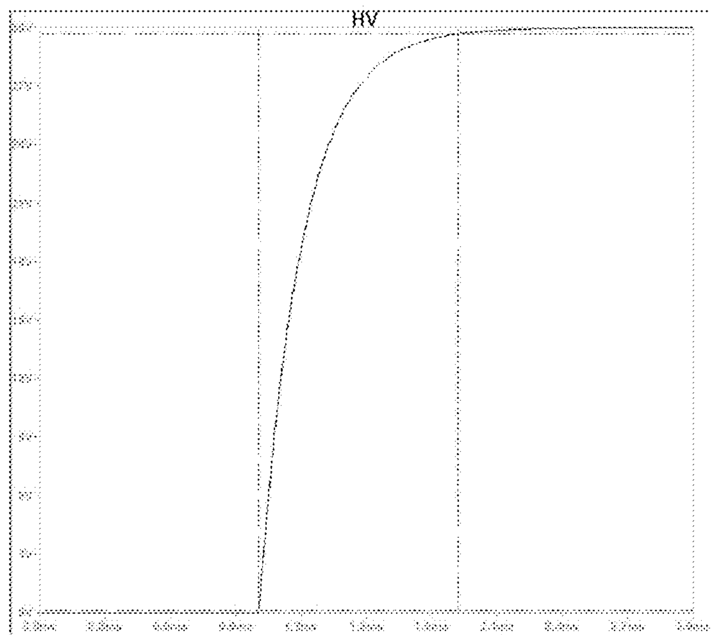
Figure 9C:
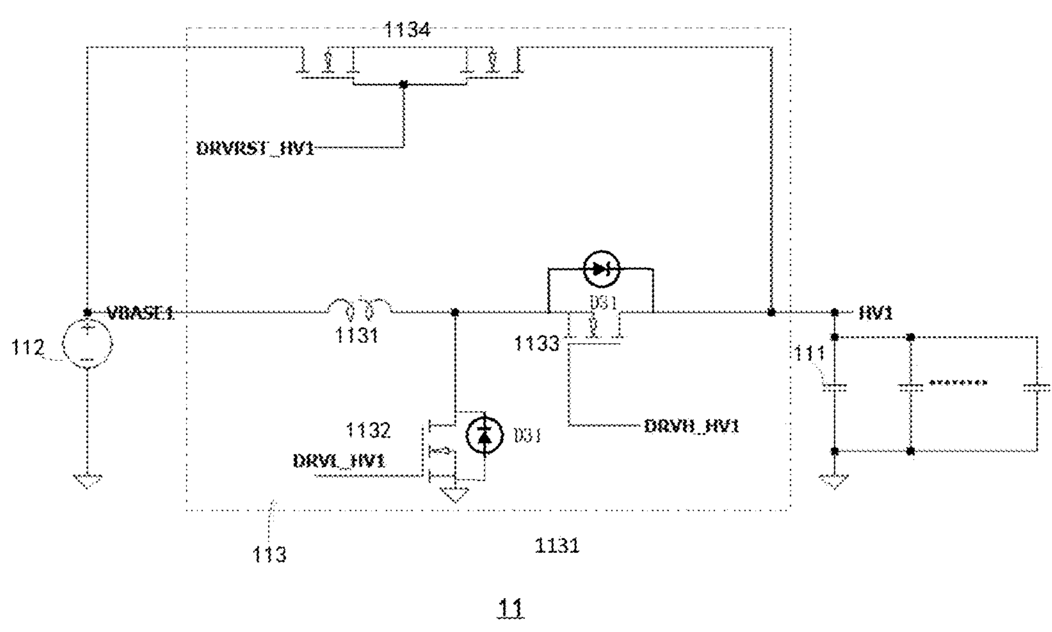

To facilitate a person skilled in the art to better understand and implement the present disclosure, FIG. 9C shows a circuit of a voltage bus, FIG. 4B shows a laser emitter circuit of three voltage buses, and FIG. 4D shows a laser emitter circuit of two voltage buses. As shown in FIG. 4B, an inductor Lx (including an inductor L1, an inductor L2, and an inductor L3), a gatex signal (including a gate1, a gate2, and a gate3), a switch Mx (including a switch M1, a switch M2, and a switch M3), and a diode Dx (including D1, D2, and D3) form an energy storage circuit. A high-side transistor Px (including a high-side transistor P1, a high-side transistor P2, and a high-side transistor P3) and a high-side transistor driver (including a driver 1, a driver 2, and a driver 3) form an activated circuit. LD1-Ldx (including LD1, LD2, and LD3) and a trigger signal form a laser emitter circuit. In addition, the diodes D11, D21, and D31 are configured to protect respective parallel switches. For example, the diode D11 protects M1. The energy storage circuit 1 includes the inductor L1, the gate1, the switch M1, and the diode D1. The activated circuit 1 includes the high-side transistor P1 and the driver 1. The specific composition of another energy storage circuit x and the activate circuit x may be analogized. Details are not described herein again.

The general operating process of the laser emitter to emit light is as follows: the energy storage circuit is configured to receive the input preparatory voltage VBase and store electrical energy, then the activated circuit is closed, and an energy storage inductor can charge a boost capacitor C and establish a high voltage on the boost capacitor C. Generally, the input voltage is not excessively high, such as 5 V or 12 V, which cannot be directly used to drive the laser emitter, and the voltage needs to be boosted. The high voltage established on the boost capacitor C can be significantly higher than the input voltage VBase, such as, 60 V, which can be used to drive the laser emitter LD. After the high voltage is established, the boost capacitor C can drive the laser emitter LDx to emit a laser beam. Three HV buses share one preparatory voltage source VBase, and three laser emitters LD share one driving device S3. These three HV buses HV1, HV2, and HV3 are not output at the same time point. At a certain time, only one of the HV1, HV2, and HV3 is output, so as to activate the discharging loop of the output capacitor C, HV, S3, and the ground (it can be understood that whether a certain energized loop is a charging loop or a discharging loop is a relative concept, which is a charging loop for the laser emitter, and a discharging loop for the capacitor C), and drive the laser emitter LD connected to the HV to emit light. The laser emitter LD may be various types of laser emitters, such as a vertical cavity surface emitting laser VCSEL, or an edge emitting laser EEL. The protection scope of the present disclosure is not limited by the type of the laser emitter.

Referring to FIG. 4B, specifically, how the energy storage circuit, the activated circuit, and the laser emitter circuit operate with each other is described by using examples of the energy storage circuit 1, the activated circuit 1, and LD1. The energy storage circuit 1 includes the inductor L1, and the diode D1 and the switch M1 that are connected to the inductor L1. One end of the inductor L1 is connected to the input voltage VIN (generally small, such as 5 V), and the other end is connected to the diode D1 and the switch M1.

If the HV1 is selected to be output at a certain time, in an energy storage stage, the switch M1 is controlled to be closed through the gate1. The closed switch M1 can be equivalent to a short circuit in the circuit. Therefore, the current generated by the input voltage VIN flows through the inductor L1 and is connected to ground through the switch M1. With the increase of the current of the inductor, the electrical energy is stored in the inductor L1.

After the energy storage stage is completed, the switch M1 is disconnected. P1 is activated through the high-side driver in the activated circuit 1. At this time, due to the current holding characteristics of the inductor L1, the current flowing through the inductor L1 does not immediately become zero, but slowly becomes zero from the current value when charging is completed. In this process, the switch M1 is disconnected and P1 is closed, therefore, the inductor L charges the boost capacitor C1, and the voltages at both ends of the boost capacitor C1 increase.

After the high voltage (such as 60 V) is established on the boost capacitor C1, if the driving switch S3 in the laser emitter circuit is selected to be closed (may be closed or disconnected through a trigger3 signal), due to the unidirectional conductivity of the diode D1, the capacitor C1 cannot discharge through the diode D1, and can only discharge through a loop of the laser emitter LD1 and the switch S3. Therefore, the current flows through the laser emitter LD1, and the capacitor C1 drives the laser emitter LD1 to emit light.

If the laser emitter LD2 is driven to emit light at the next moment, the energy storage circuit 2, the activated circuit 2, and the LD2 can repeat the operating process of the energy storage circuit 1, the activated circuit 1, and the LD1. If the laser emitter LD3 is driven to emit light at the next moment, the energy storage circuit 3, the activated circuit 3, and the LD3 can repeat the operating process of the energy storage circuit 1, the activated circuit 1, and the LD1. Details are not described herein again.

FIG. 4C provides a simulation diagram of the operating of the laser emitter circuit shown in FIG. 4B. The horizontal axis is time t and the vertical axis is voltage V. A curve 401 represents the change of the HV1, a curve 402 represents the change of the HV2, and a curve 403 represents the change of the HV3. It can be seen from the figure that the HV1 is output within a period from 0.5 μs to 3.5 μs, the HV2 is output within a period from 5.5 μs to 8.5 μs, and the HV3 is output within a period from 10.5 μs to 13.5 μs. The output time of the HV1, HV2, and HV3 does not coincide, and one or more laser emitters connected to the voltage buses outputting the HV1, HV2 and HV3 can be respectively activated to emit light.

In order to facilitate a person skilled in the art to understand the present disclosure, FIG. 4D shows a solution of a two-bus laser emitter circuit. Next, another embodiment of this application is introduced with reference to FIG. 4D and FIG. 9C. As shown in the figure, the high-voltage generation unit 113 includes a first inductor 1131, a first switch 1132, and a second switch 1133. The first inductor 1131 has a first end connected to the preparatory voltage source 112, and is configured to receive electrical energy from the preparatory voltage source 112. The first switch 1132 has a first end connected to a second end of the first inductor 1131 and a second end connected to ground, the first switch configured to, upon being closed cause the preparatory voltage source 112 and the first inductor 1131 to form a charging loop, and cause the first inductor 1131 to be charged. The second switch 1133 has a first end connected to the second end of the first inductor 1131 and a second end connected to the capacitor unit 111, the second switch configured to, upon being closed cause the preparatory voltage source 112 and the first inductor 1131 to form a discharging loop, and cause the capacitor unit 111 to be charged. In addition, the diodes D1 are configured to protect respective parallel switches. For example, the diode D1 protects the first switch 1132. The diode D2 is configured to accelerate the conduction and power supply. For example, the diode D2 accelerates the supply of the HV2. Compared with the solution in FIG. 4B, the capacitance value of the capacitor C that can be selected to charge the laser emitter in this embodiment is relatively larger.

According to an exemplary embodiment of the present disclosure, as shown in FIG. 4D, the high voltages output by the two voltage buses are the HV1 and the HV2 respectively, and a certain quantity of laser emitters 121 are mounted on each bus (specifically, as shown in FIG. 4D, 121-1, 121-3 and 121-5 are mounted on the voltage bus with the output voltage of the HV1, and 121-2, 121-4 and 121-6 are mounted on the voltage bus with the output voltage of the HV2). Two adjacent laser emitters share a GaN switch as a driver (specifically, as shown in FIG. 4D, the laser emitters 121-1 and 121-2 share the GaN switch 13-1, the laser emitters 121-3 and 121-4 share the GaN switch 13-2, and the laser emitters 121-5 and 121-6 share the GaN switch 13-3). The driving signal DRV1 shown in the figure is used to drive the GaN switch 13-1, and determine on/off and an on/off duration of the GaN switch 13-1. Similarly, the driving signal DRV2 shown in the figure is used to drive the GaN switch 13-2, and determine on/off and an on/off duration of the GaN switch 13-2. DRV3 is used to drive the GaN switch 13-3, and determine on/off and an on/off duration of the GaN switch 13-3.

As shown in FIG. 4D and FIG. 9C, the high-voltage generation unit 113 of the power supply unit 11 has three control signals, that is, a low-side driving signal DRVL_HV1 (for driving the first switch 1132), a high-side driving signal DRVH_HV1 (for driving the second switch 1133), and a reset driving signal DRVRST_HV1 (for driving the reset switch 1134) shown in the figure. Input ends of the control signals of the low-side driving signal DRVL_HV1, the high-side driving signal DRVH_HV1, and the reset driving signal DRVRST_HV1 together form a voltage control end of the power supply unit 11. According to an exemplary embodiment of the present disclosure, the voltage control end can receive an external voltage control signal to control the power supply unit 11 to output the voltage.

According to an exemplary embodiment of the present disclosure, as shown in FIG. 4A, each switching device 13 includes a control end (the input ends of the driving signals DRV1, DRV2, and DRV3 shown in the figure), a first end, and a second end. The control end is configured to receive the driving signal to control on/off between the first end and the second end. The first end is connected to the cathodes of one or more laser emitters 121 activated by the switching device. The second end is connected to ground. The voltage control signal and the driving signal cooperate with each other to control the laser emitter 121 to emit light. Preferably, the switching device 13 includes one or more of a GaN switch and a CMOS switch.

Figure 4E:
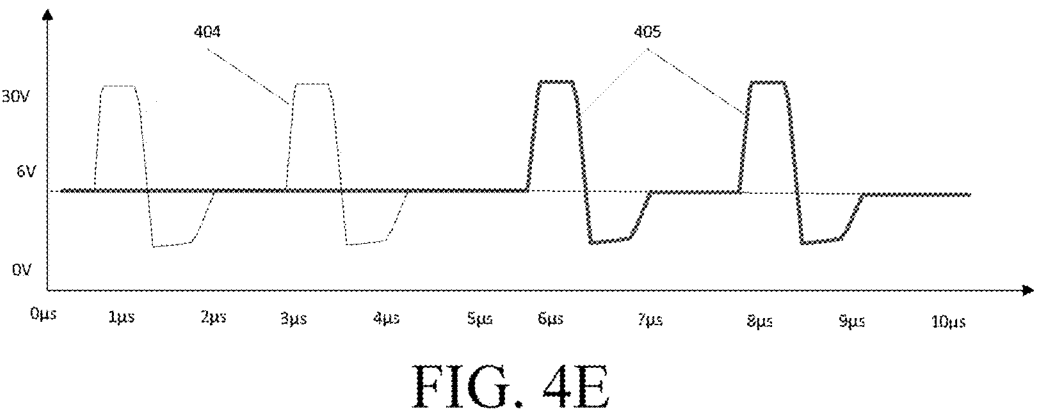

FIG. 4E provides a simulation diagram of the operating of the laser emitter circuit shown in FIG. 4D. The horizontal axis is time t and the vertical axis is voltage V. A relatively thin curve 404 represents the change of the HV1, and a relatively thick curve 405 represents the change of the HV2. It can be seen from the figure that the HV1 is output within a period from 0.5 μs to 3.5 μs, and the HV2 is output within a period from 5.5 μs to 8.5 μs. The output time of the HV1 and HV2 does not coincide, and one or more laser emitters connected to the voltage buses outputting the HV1, and HV2 can be respectively activated to emit light.

According to an exemplary embodiment of the present disclosure, the present disclosure further provides a method for controlling the emitting apparatus 10 as described above (as shown in FIG. 4A) to emit light, which may include the following steps:

Step S201: Control a power supply unit 11 to output a high voltage.

Step S202: Control a current loop of a subnet of laser emitters 121 to be connected through a switching device 13, so that the laser emitters 121 connected to the power supply unit 11 emit light under the action of the high voltage.

According to an exemplary embodiment of the present disclosure, the emitting apparatus 10 further includes a plurality of voltage buses 14 corresponding to a plurality of power supply units 11, where each voltage bus 14 is connected to components on the corresponding power supply units 11, an input end of the voltage bus 14 receives a preparatory voltage, an output end outputs a voltage higher than the preparatory voltage, each laser emitter 121 is connected to the output end of the corresponding power supply unit 11 through one of the voltage buses 14, and the power supply unit 11 includes a capacitor unit 111, connected to the voltage bus 14. The control method further includes:

charging the capacitor unit 111 through the voltage bus 14, and discharging the corresponding laser emitter 121 connected to the same voltage bus 14 through the capacitor unit 111, to drive the corresponding laser emitter 121 to emit light.

According to an exemplary embodiment of the present disclosure, the power supply unit 11 further includes a preparatory voltage source 112 and a high-voltage generation unit 113.

The control method further includes:

outputting the preparatory voltage through the preparatory voltage source 112; and generating a voltage higher than the preparatory voltage by the high-voltage generation unit 113; and outputting the voltage via the voltage bus 14.

According to an exemplary embodiment of the present disclosure, the high-voltage generation unit 113 includes: a first inductor 1131, a first end of which is connected to the preparatory voltage source 112, a first switch 1132 having a first end connected to a second end of the first inductor 1131 and a second end connected to ground, and a second switch 1133 having a first end connected to the second end of the first inductor 1131 and a second end connected to the capacitor unit 111. The control method further includes:

outputting electrical energy from the preparatory voltage source 112 through the first inductor 1131;

causing the preparatory voltage source 112 and the first inductor 1131 to form a charging loop by connecting the first switch 1132, thus charging the first inductor 1131; and causing the preparatory voltage source 112 and the first inductor 1131 to form a discharging loop by connecting the second switch 1133, thus charging the capacitor unit 111.

According to an exemplary embodiment of the present disclosure, the power supply unit 11 further includes a voltage control end. The control method further includes:

receiving a voltage control signal through the voltage control end, to control the power supply unit 11 to output the voltage.

According to an exemplary embodiment of the present disclosure, each switching device 13 includes a control end, a first end, and a second end, where the control end is configured to receive a driving signal to control a connection state between the first end and the second end, the first end is connected to a cathode of a laser emitter activated by the switching device 13, and the second end is connected to ground. The control method further includes:

cooperating the voltage control signal and the driving signal with each other to control one or more laser emitters corresponding to the switching device 13 to emit light.

Figure 1A:
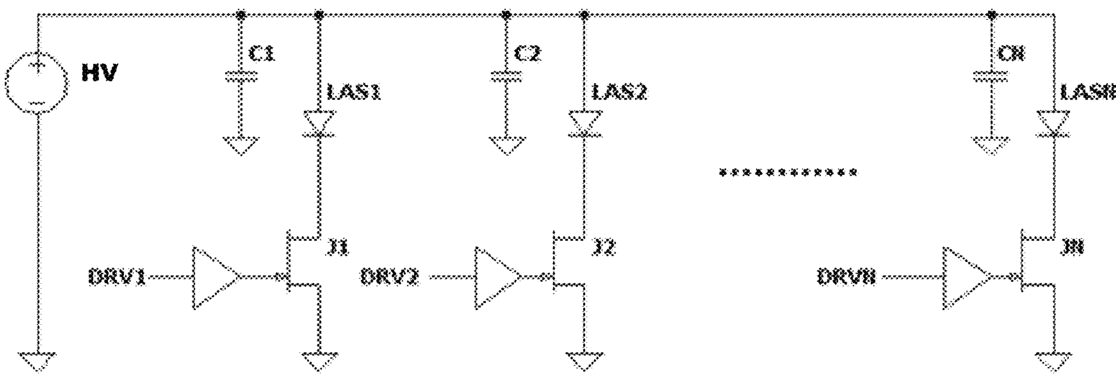
Figure 1B:
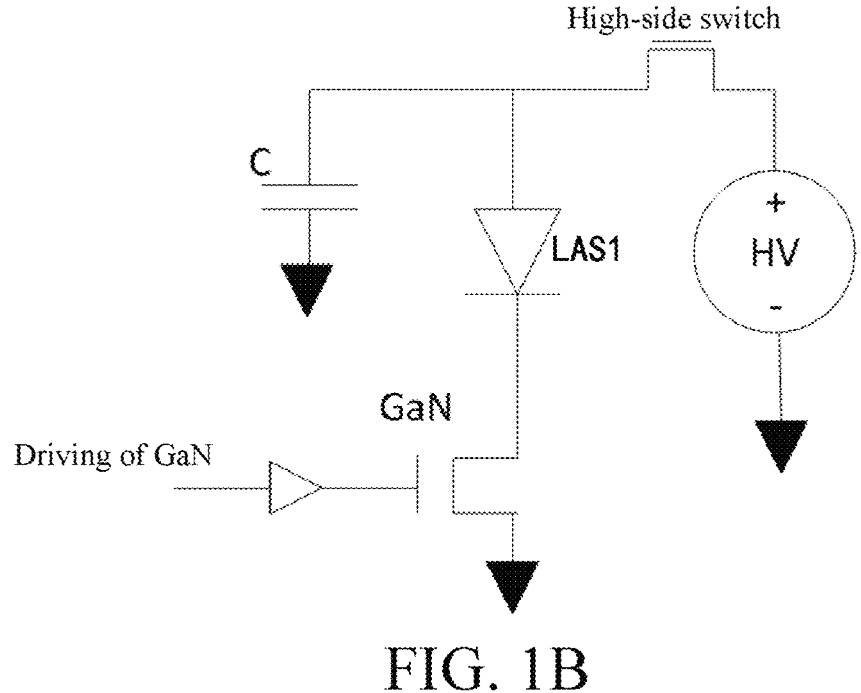
Figure 2A:
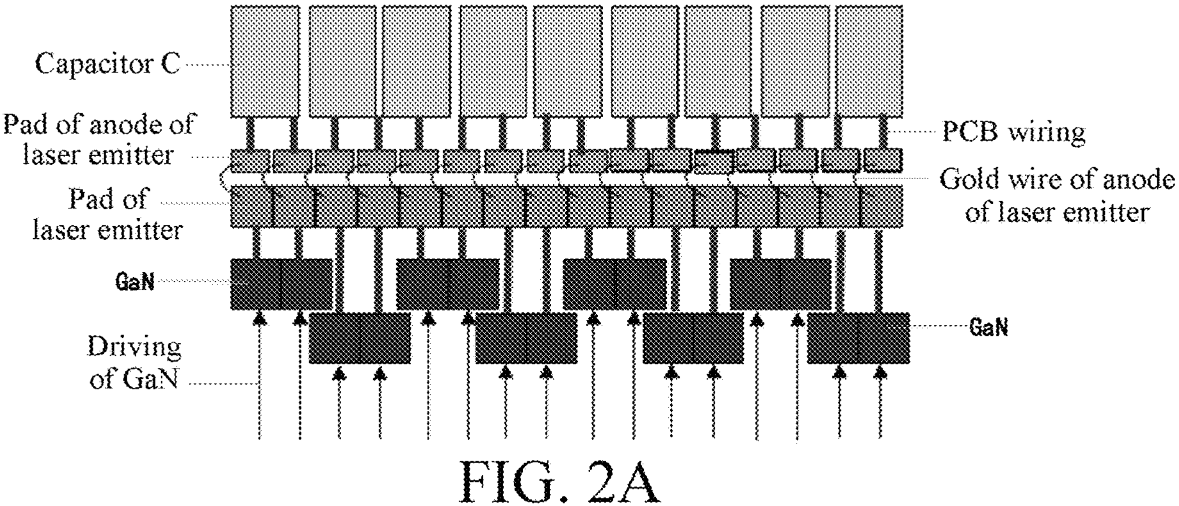
Figure 2B:
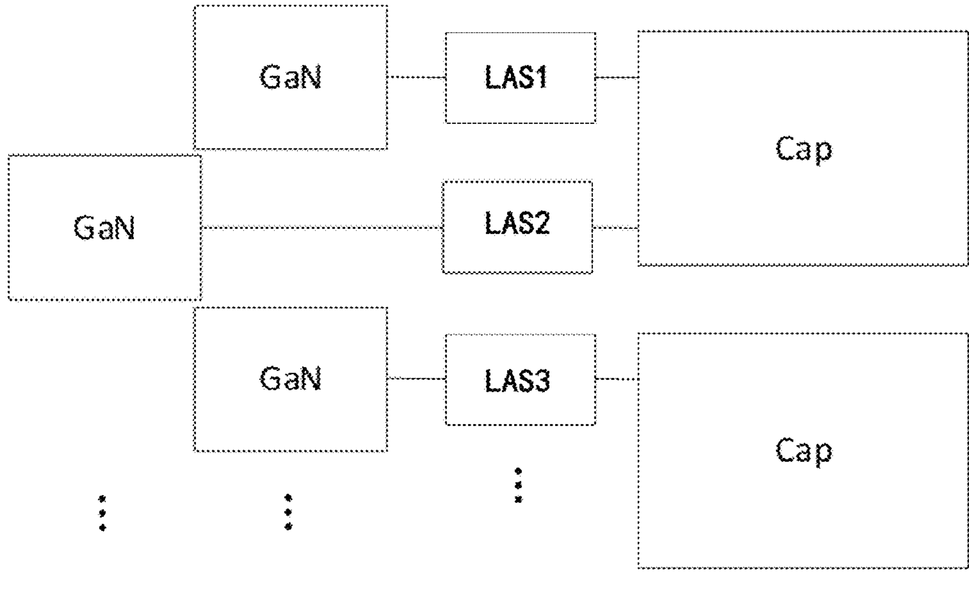
Figures 5, 6:
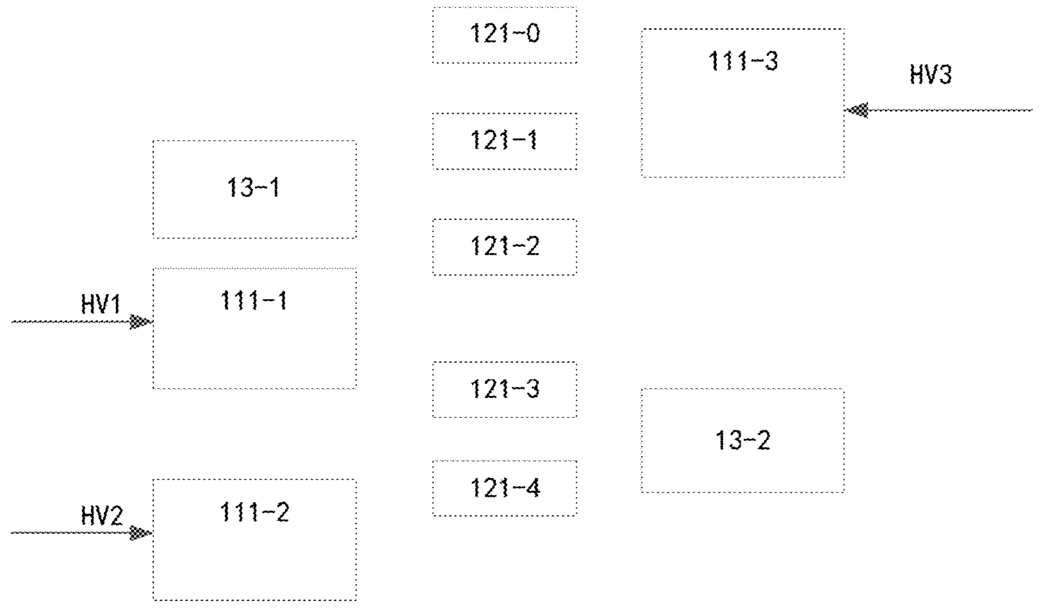

The present disclosure provides a method of arranging the emitting apparatus 10 as described above on a PCB: As shown in FIG. 5, a plurality of laser emitters 121 are arranged in a single column, and the GaN switching device corresponding to adjacent laser emitters may be arranged on both sides. As shown in the figure, the laser emitters 121-1 and 121-2 correspond to the GaN switch 13-1, and the laser emitters 121-3 and 121-4 correspond to the GaN switch 13-2. The laser emitters 121-0 and 121-1 are supplied with the high voltage HV3 through the capacitor 111-3. The laser emitters 121-2 and 121-3 are supplied with the high voltage HV1 through the capacitor 111-1. The laser emitter 121-4 is supplied with the high voltage HV2 through the capacitor 111-2. The high voltages HV1, HV2, and HV3 may not be supplied simultaneously, that is, at different times, so that any one of the plurality of laser emitters 121 can be individually activated and controlled. A ratio of a quantity of the laser emitters to a quantity of the GaN switching devices is 2:1, which is equivalent to that two laser emitters share one GaN switching device. These two laser emitters are driven by the GaN device to emit light. It is easy to implement in the foregoing plurality of exemplary embodiments by using the emitting apparatus of the present disclosure. The switching devices are arranged on both sides of the laser emitters in the single column, so that distances between the plurality of laser emitters and the switching devices activating the laser emitters are approximately equal, and there is no inconsistency in a test parameter, resulting in a better consistency of detection channels. Compared with the arrangement of one GaN switching device drives one laser emitter (as shown in FIG. 2A and FIG. 2B), the length of the discharging loop is basically the same, and emitting powers of the laser emitters are also substantially the same.

As shown in FIG. 6, the present disclosure further provides another method for arranging the emitting apparatus 10 as described above on a PCB: A plurality of laser emitters 121 are arranged in a single column. A GaN switching device and a capacitor C are arranged on the same side of the laser emitters in the column. A wiring is divided into three layers. The first layer of wiring is connected to ground and connects the GaN switching and the capacitor. The second layer of wiring connects the GaN switching device and the laser emitter. The third layer of wiring connects all capacitors. A capacitor unit mounted on the voltage bus of the output voltage HV1 is connected to the corresponding laser emitter on the first layer of wiring. A capacitor unit mounted on the voltage bus of the output voltage HV2 is connected to the corresponding laser emitter on the second layer of wiring. Since the quantity of the GaN devices is less than the quantity of the laser emitters, such wiring method can also make the distances between the laser emitters and the GaN switching device driving the laser emitters equal, so that the discharging loops of the laser emitters are roughly equal, and there is no difference in the emitting power.

Figure 7:
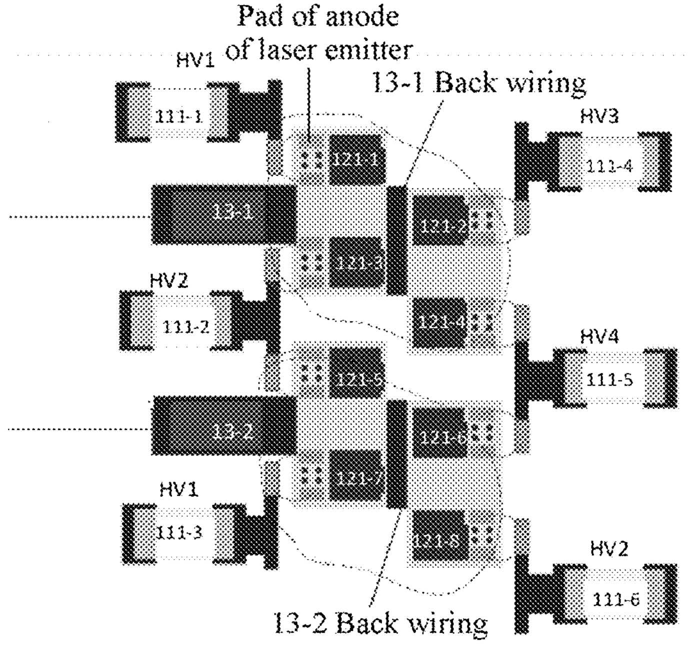
Figure 8:
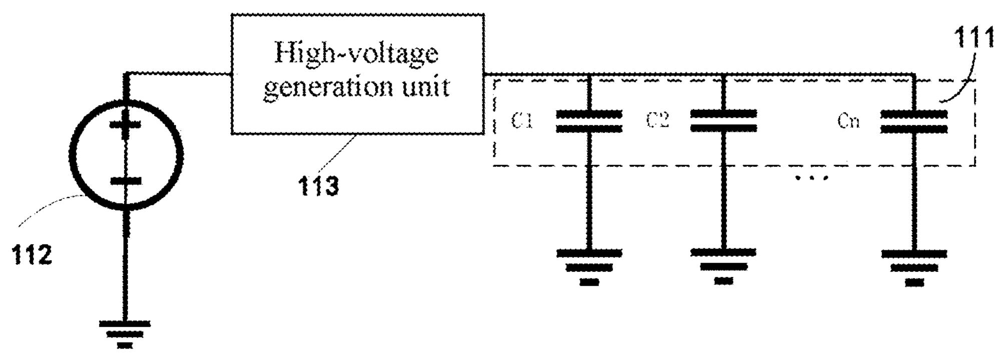

According to an exemplary embodiment of the present disclosure, FIG. 7 shows an arrangement method of an emitting apparatus 10 of a four-bus power supply system on a PCB: The two columns of laser emitters are staggered. The laser emitters 121-1, 121-2, 121-3, and 121-4 shown in the figure are respectively connected to four different power supply units (as shown in the figure, the output voltages of the four power supply units are HV1, HV2, HV3, and HV4 respectively). The four laser emitters 121-1, 121-2, 121-3, and 121-4 share a GaN switch 13-1, which reduces the quantity of the GaN switching devices. The GaN switch 13-1 connects the laser emitters 121-1 and 121-3 by wiring on the PCB, and connects the laser emitters 121-2 and 121-4 by wiring on the back side of the PCB, so that the distances between the four laser emitters 121-1, 121-2, 121-3 and 121-4 and the GaN switch 13-1 driving the laser emitters are approximately equal, the discharging loops of the laser emitters are equal, and the emitting power of the plurality of laser emitters is consistent. The staggered arrangement of the laser emitters in the two columns can double the density of placement of the laser emitters, thereby doubling the vertical angular resolution of the lidar.

In this exemplary embodiment, all GaN switching devices are arranged on one side, and each GaN switching device corresponds to a plurality of laser emitters, which can ensure the consistency of the wiring between the plurality of laser emitters and the GaN switching device corresponding to the laser emitters. In addition, since two GaN switching devices, such as the GaN switch 13-1 and the GaN switch 13-2 shown in the figure, are farther apart, and there is more room in the arrangement space. The four laser emitters 121-1, 121-2, 121-3, and 121-4 shown in FIG. 7 correspond to different capacitors 111-2 and 111-5 respectively. Each laser emitter, the capacitor corresponding thereto and the GaN switching device together form an energized loop. Therefore, the four laser emitters can emit light respectively according to a certain time sequence.

According to an exemplary embodiment of the present disclosure, as shown in FIG. 16, the present disclosure further provides a lidar 20, including the emitting apparatus 10 as described above, a receiving apparatus 21, and a control apparatus 22. The emitting apparatus 10 is suitable for driving laser emitters to emit a detection laser beam according to a certain time sequence under the control of the control apparatus 22. The receiving apparatus 21 is suitable for receiving an echo reflected by an external obstacle relative to the lidar. The control apparatus 22 is suitable for generating a voltage control signal (DRVH_HV1, DRVL_HV1, or DRVRST_HV1 shown in FIG. 4D) according to a detection demand of the lidar, controlling a power supply unit to output a voltage, and generating a driving signal (DRV1, DRV2, or DRV3 shown in FIG. 4A) to activate a subnet of the laser emitters to emit light; and is suitable for processing the echo received by the receiving apparatus 21, and calculating a distance between the external obstacle and the lidar and/or reflectivity according to an echo signal.

According to an exemplary embodiment of the present disclosure, FIG. 17 shows an application scenario of the present disclosure. An unmanned vehicle is equipped with the lidar 20. The emitting apparatus 10 in the lidar 20 outputs voltages at different times through different power supply units under the control of the control apparatus 22, and respectively activates a subnet of the laser emitters to emit the detection beam. The receiving apparatus 21 receives the echo of the detection beam reflected by the external obstacle, and calculates the distance between the external obstacle and the lidar (unmanned vehicle) and/or reflectivity according to the echo signal through the processing by the control apparatus 22. The control apparatus 22 controls the plurality of power supply units of the emitting apparatus 10 to output the voltage by generating the voltage control signal, and activates a subnet of the laser emitters to emit light by generating the driving signal.

An exemplary embodiment of the present disclosure provides an emitting apparatus for a lidar and a control method thereof. A plurality of power supply units are used to activate laser emitters connected to the power supply units to emit light, a plurality of laser emitters that do not share a voltage can share a GaN switching device to activate a certain laser emitter or a certain row or a certain column of laser emitters individually, one by one, which reduces cost and volume of an emitting end, and makes the size of the GaN switching device no longer the limit of vertical angular resolution of the lidar. The GaN switching device may be arranged at both sides of the plurality of laser emitters, or use a wiring method of wiring on back of PCB, so that emitting power of the plurality of laser emitters is consistent, the plurality of laser emitters are staggered, and the angular resolution in the vertical direction is increased.

Second Aspect

In order to achieve rapid adjustment of the voltage of the power supply HV, rapid boost from the preparatory voltage, and rapid adjustment of the output voltage, thereby achieving rapid adjustment of the light intensity of the laser emitter, as shown in FIG. 9C, the present disclosure further provides a power supply unit 11 of a laser emitter, including: a capacitor unit 111, a preparatory voltage source 112, and a high-voltage generation unit 113. The preparatory voltage source 112 is configured to output a preparatory voltage. The high-voltage generation unit 113 is coupled to the preparatory voltage source 112, and configured to receive the preparatory voltage, generate an output voltage higher than the preparatory voltage, and output the output voltage via an output end. The capacitor unit 111 is coupled to the output end of the high-voltage generation unit 113. The capacitor unit 111 and the high-voltage generation unit 113 are configured to cooperatively adjust the output voltage through charge and discharge processes.

FIG. 9C shows a specific implementation structure of a power supply unit 11 according to an exemplary embodiment of the present disclosure. The preparatory voltage source 112 outputs the preparatory voltage (VBASE1 shown in the figure). The high-voltage generation unit 113 is coupled to the preparatory voltage source 112 to convert the preparatory voltage VBASE1 into a high voltage to output (HV1 shown in the figure). The capacitor unit 111 is coupled to the output end of the high-voltage generation unit 113, and cooperatively adjusts the output voltage HV1 together with the high-voltage generation unit 113 through charge and discharge processes.

According to an exemplary embodiment of the present disclosure, as shown in FIG. 9C, the high-voltage generation unit 113 includes: a first inductor 1131, a first switch 1132, and a second switch 1133. The first inductor 1131 has a first end connected to the preparatory voltage source 112, and is configured to receive electrical energy from the preparatory voltage source 112. The first switch 1132 has a first end connected to a second end of the first inductor 1131 and a second end connected to ground, the first switch configured to, upon being closed cause the preparatory voltage source 112 and the first inductor 1131 to form a charging loop, and cause the first inductor 1131 to be charged. The second switch 1133 has a first end connected to the second end of the first inductor 1131, and a second end connected to the capacitor unit 111 as the output end of the high-voltage generation unit 113.

Figure 10A:
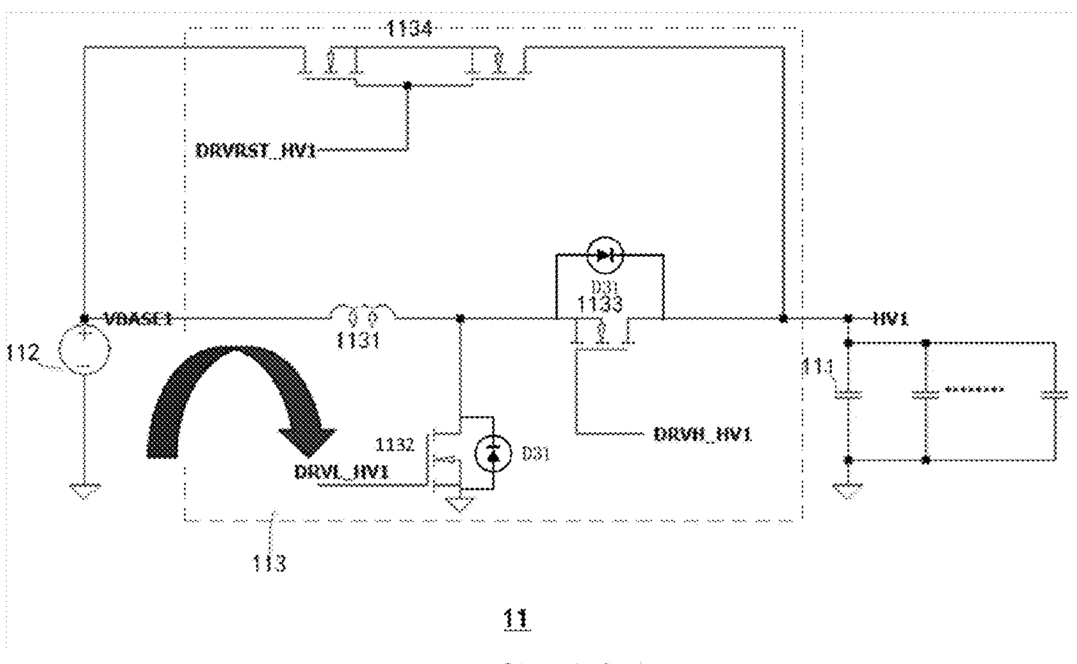
Figures 10B, 11A:
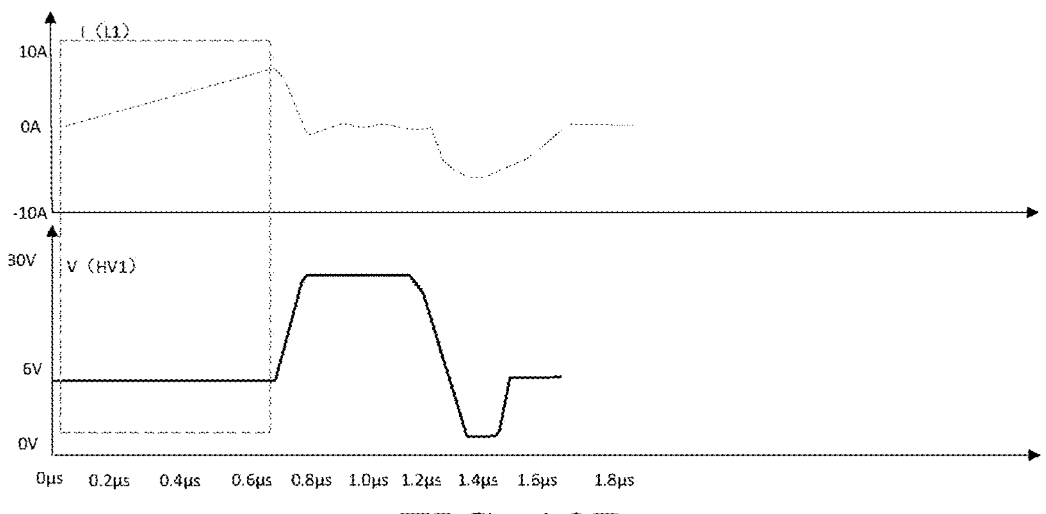

As shown in FIG. 10A, in a direction of a current flow of a charge stage, the first switch 1132 is closed, the second switch 1133 is disconnected, and the preparatory voltage source 112 and the first inductor 1131 form a charging loop. As shown in FIG. 10B, the horizontal axis is time. The upper curve is the curve of the current of the first inductor 1131 varied with time, and the lower curve is the curve of the output voltage HV1 of the power supply unit 11 varied with time. The first switch 1132 is closed. At this time, the current of the first inductor 1131 rises linearly according to a slope of VBASE/L, where L is inductance of the first inductor 1131. The output voltage HV1 of the power supply unit 11 maintains an initial value (equal to VBASE).

Figure 11B:
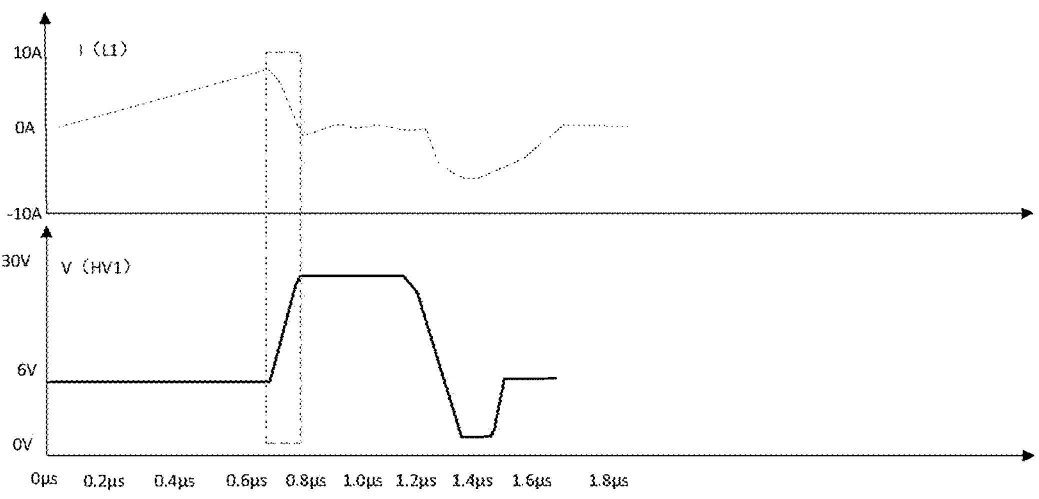

As shown in FIG. 11A, in a direction of a current flow of a charge stage 2, the first switch 1132 is disconnected, and since the current on the first inductor 1131 cannot suddenly change, reverse electromotive force Vls is generated on an inductor Ls to maintain the passing current unchanged. At this time, the second switch 1133 is closed. After the preparatory voltage source 112 and the first inductor 1131 are connected in series, the capacitor unit 111 is charged with a voltage greater than VBASE, so that the voltage of the capacitor unit 111 rises to VBASE+VLs. As shown in FIG. 11B, the horizontal axis is time. The upper curve is the curve of the current of the first inductor 1131 varied with time, and the lower curve is the curve of the output voltage HV1 of the power supply unit 11 varied with time. The first switch 1132 is disconnected and the second switch 1133 is closed. At this time, the first inductor 1131 and the capacitor unit 111 form resonance. The voltage of the capacitor unit 111 resonantly rises from the initial voltage VBASE. When the current of the first inductor 1131 decreases to zero, the second switch 1133 is disconnected, and at this time, the capacitance of the capacitor unit rises to a target voltage.

Figure 12A:
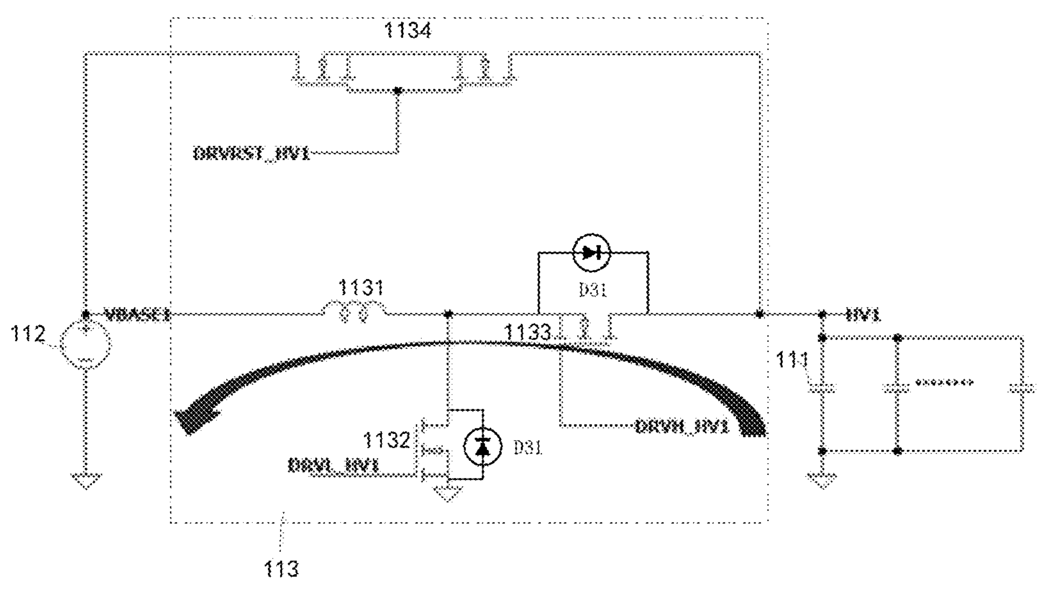
Figure 12B:
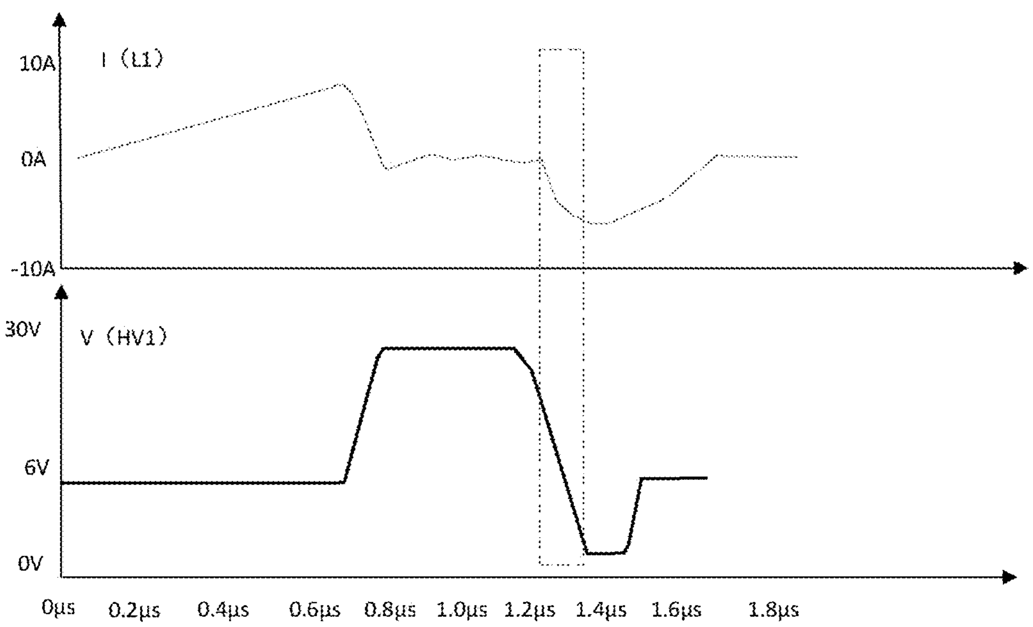

As shown in FIG. 12A, in a direction of a current flow of a discharge stage 1, the first switch 1132 is disconnected, the second switch 1133 is closed, and the capacitor unit 111 discharges the first inductor 1131 as a power supply. At this time, one or certain laser emitters do not need to emit light or need to reduce the luminous intensity, and the fully charged capacitor unit 111 releases a subnet of energy back to the first inductor 1131 to save energy. As shown in FIG. 12B, the horizontal axis is time. The upper curve is the curve of the current of the first inductor 1131 varied with time, and the lower curve is the curve of the output voltage HV1 of the power supply unit 11 varied with time. The first switch 1132 is disconnected and the second switch 1133 is closed. The capacitor unit 111 and the first inductor 1131 form resonance. The voltage of the capacitor unit 111 resonantly decreases. After the voltage drops to a target voltage, the second switch 1133 is disconnected.

Figure 13A:
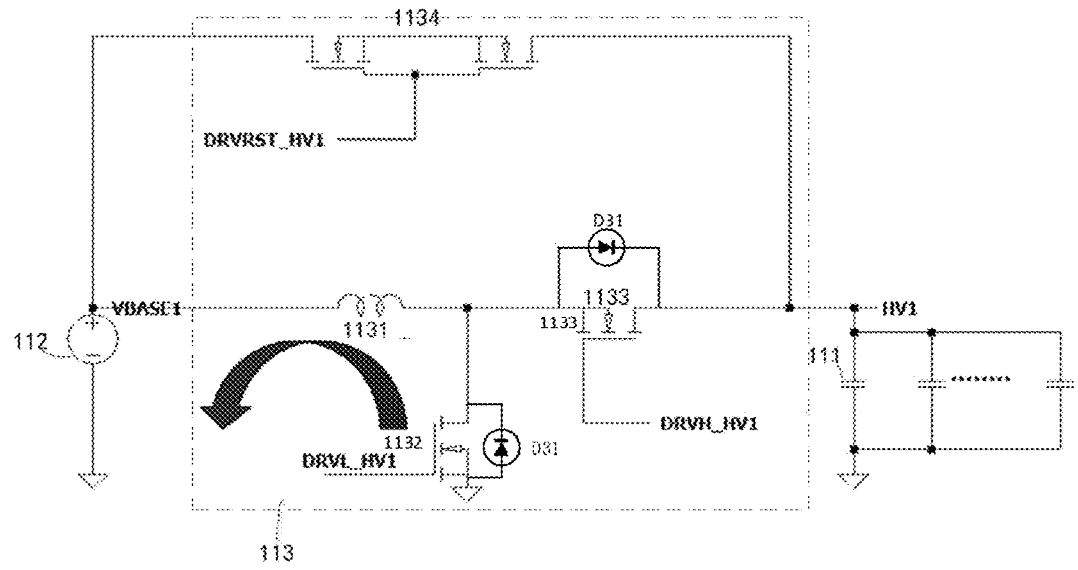
Figure 13B:
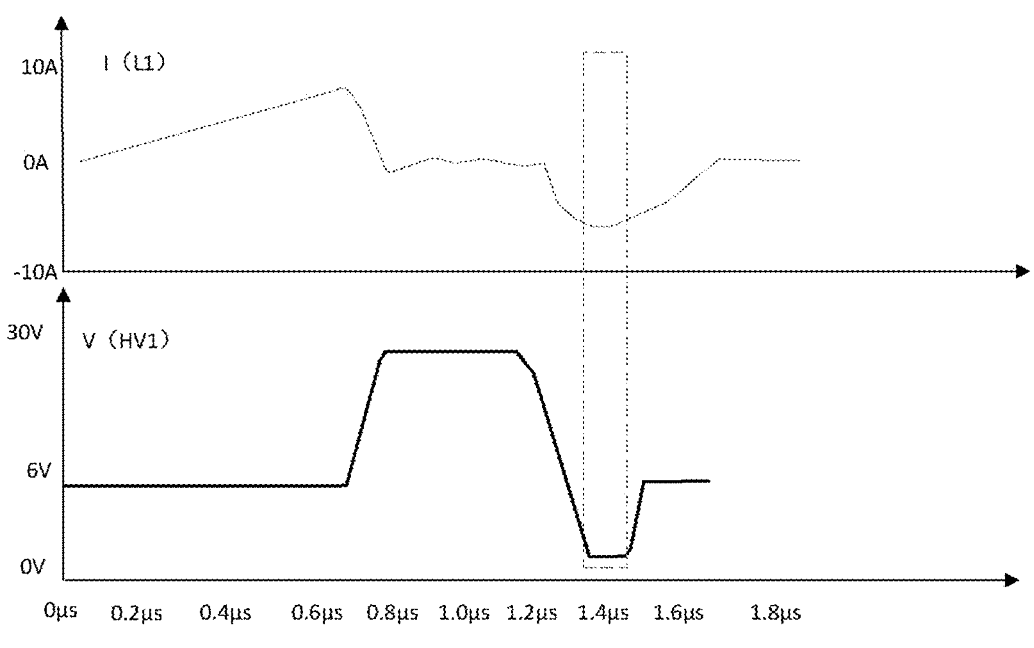

As shown in FIG. 13A, in a direction of a current flow of a discharge stage 2, the first switch 1132 is closed, the second switch 1133 is disconnected, and the preparatory voltage source 112 and the first inductor 1131 form the discharging loop. As shown in FIG. 13B, the horizontal axis is time. The upper curve is the curve of the current of the first inductor 1131 varied with time, and the lower curve is the curve of the output voltage HV1 of the power supply unit 11 varied with time. The current of the first inductor decreases according to a slope of −VBASE/L.

According to an exemplary embodiment of the present disclosure, as shown in FIG. 9C, the power supply unit 10 further includes a reset switch 1134, where the reset first switch 1134 is connected between the preparatory voltage source 112 and the capacitor unit 111, and is configured to reduce the output voltage HV1 back to the preparatory voltage VBASE. Preferably, the first switch 1132, the second switch 1133, and the reset switch 1134 include one or more of a GaN switch and a CMOS switch. The reset switch 1134 may be built with discrete devices such as a MOS transistor and a GaN switch, or with an activating switch.

Figure 14A:
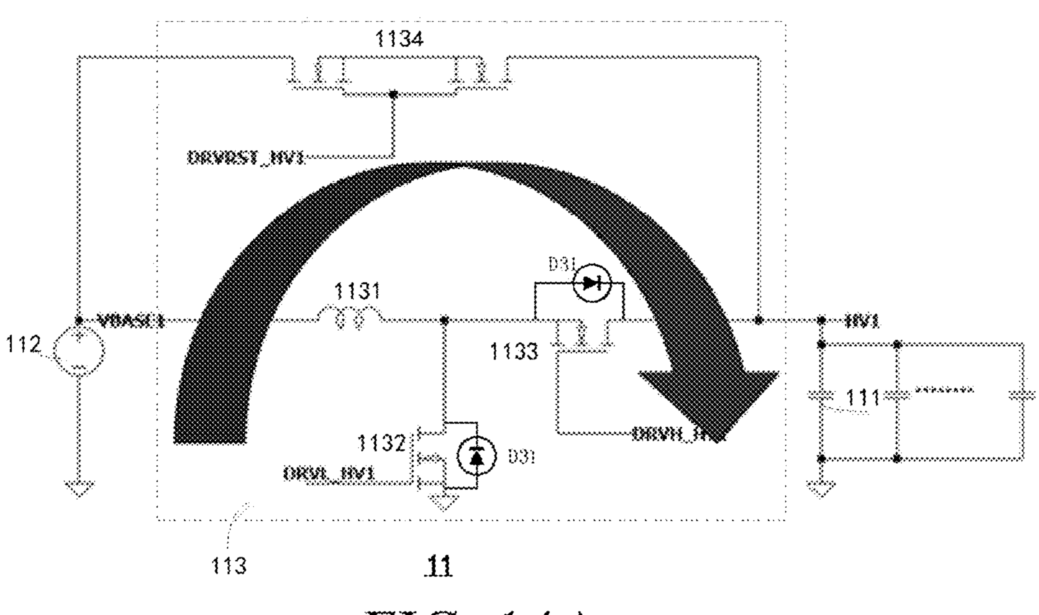
FIG. 14B shows change curves of a first inductor and an output voltage of a power supply unit according to an exemplary embodiment of the present disclosure.
Figure 14B:
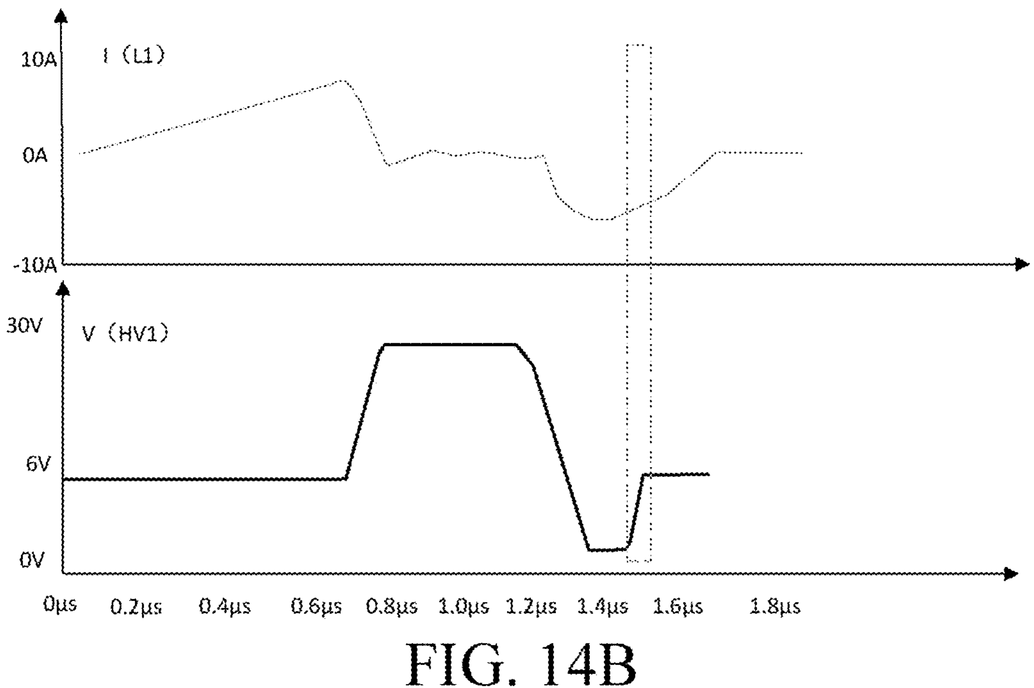

As shown in FIG. 14A, the reset switch 1134 is closed and the first inductor 1131 is reset, to prevent a parasitic capacitor of the first inductor 1131 and the first switch 1132 from resonating again. The resonance affects the capacitor unit 111 and the next charge process. As shown in FIG. 14B, the horizontal axis is time. The upper curve is the curve of the current of the first inductor 1131 varied with time, and the lower curve is the curve of the output voltage HV1 of the power supply unit 11 varied with time. The output voltage HV1 quickly boosts to the preparatory voltage VBASE.

It can be seen from the foregoing plurality of embodiments that the fast bus power supply system provided in the present disclosure requires three control signals, that is, a low-side driving signal controlling the first switch 1132 (DRVL_HV1 shown in FIG. 9C), a high-side driving signal controlling the second switch 1133 (DRVH_HV1 shown in FIG. 9C), and a reset signal controlling the reset switch 1134 (DRVRST_HV1 shown in FIG. 9C). The proper coordination of the three signals can achieve the adjustment time of <1 us, thus the light intensity of the laser emitter can be adjusted pixel by pixel.

According to an exemplary embodiment of the present disclosure, the present disclosure further provides a control unit for controlling the power supply unit 11 as described above, where a high-voltage generation unit 113 includes a first switch 1132, a second switch 1133, and a reset switch 1134, and the control unit includes: generating a voltage control signal according to a time sequence of light emission of laser emitters, and outputting the voltage control signals (that is, DRVL_HV1, DRVH_HV1, or DRVRST_HV1 shown in FIG. 9C) to control electrodes of the first switch 1132, the second switch 1133, and the reset switch 1134 respectively, to control the high-voltage generation unit 113 to output an output voltage higher than a preparatory voltage, and control a capacitor unit 111 and the high-voltage generation unit 113 to cooperatively adjust the output voltage through charge and discharge processes.

According to an exemplary embodiment of the present disclosure, as shown in FIG. 4A, the present disclosure further provides an emitting apparatus 10 of a lidar, including: a plurality of power supply units 11 as described above, configured to receive a preparatory voltage and output a high voltage, where at least two power supply units 11 output the high voltage at relatively different times, and the high voltage is a voltage higher than the preparatory voltage; a laser emitter unit 12, including a plurality of laser emitters 121, where an anode of each laser emitter 121 is connected to an output end of one of the power supply units 11, so that at least two of the laser emitters 121 are connected to different power supply units 11; and at least one switching device 13, where other ends of a subset of laser emitters 121 that do not share the voltage are connected to one of the switching devices 13, and the switching device 13 is configured to control a connection state of a current loop formed by the corresponding power supply unit 11, the laser emitter 121 connected to the switching device 13, and the ground.

Figure 15:
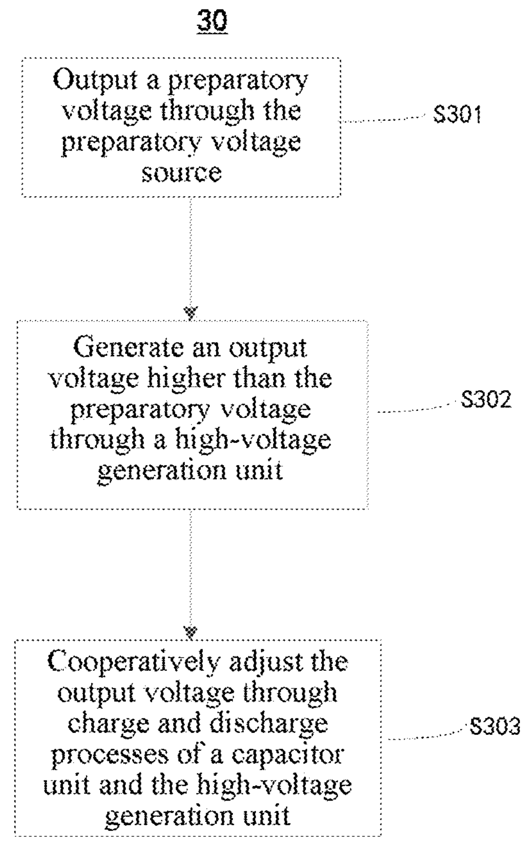
FIG. 15 shows a method for controlling a laser emitter to emit light by using a power supply unit according to an exemplary embodiment of the present disclosure.

According to an exemplary embodiment of the present disclosure, as shown in FIG. 15, the present disclosure further provides a method 30 for controlling a laser emitter to emit light by using the power supply unit 11 as described above, including the following steps:

Step S301: Output a preparatory voltage through the preparatory voltage source 112.

Step S302: Generate an output voltage higher than the preparatory voltage through a high-voltage generation unit 113.

Step S303: Cooperatively adjust the output voltage through charge and discharge processes of a capacitor unit 111 and the high-voltage generation unit 113.

According to an exemplary embodiment of the present disclosure, the high-voltage generation unit 113 includes: a first inductor 1131, a first end of which is coupled to the preparatory voltage source 112, a first switch 1132 having a first end coupled to a second end of the first inductor 1131 and a second end connected to ground, and a second switch 1133 having a first end coupled to the second end of the first inductor 1131 and a second end coupled to the capacitor unit 111. The method 30 further includes:

outputting electrical energy from the preparatory voltage source 112 through the first inductor 1131;

causing the preparatory voltage source 112 and the first inductor 1131 to form a charging loop by closing the first switch 1132 and opening the second switch 1133, thus charging the first inductor 1131 by the preparatory voltage source 112; and causing the preparatory voltage source 112 and the first inductor 1131 to form a discharging loop by disconnecting the first switch 1132 and closing the second switch 1133, thus charging the capacitor unit 111 by the preparatory voltage source 112 and the first inductor 1131, so that the output voltage is higher than the preparatory voltage.

According to an exemplary embodiment of the present disclosure, the method 30 further includes:

causing the capacitor unit 111 discharge by disconnecting the first switch 1132 and closing the second switch 1133, where the first inductor 1131 receives electrical energy from the capacitor unit 111 to reduce the output voltage.

According to an exemplary embodiment of the present disclosure, the power supply unit 11 further includes a reset switch 1134, where the reset switch 1134 is connected between the preparatory voltage source 112 and the capacitor unit 111. The method 30 further includes:

reducing the output voltage back to the preparatory voltage through the reset switch 1134.

An exemplary embodiment of the present disclosure provides a power supply unit including an LC resonant circuit. Due to the characteristics of the LC resonant circuit, a charge-discharge speed of the power supply unit for a mounted capacitor is greatly improved. Compared with a solution of a feedback circuit used in another embodiment, the speed is increased by a thousand times.

To reflect the effect of the HV supply circuit in this application, FIG. 9A shows a structure of a conventional HV supply circuit. The power supply in FIG. 9A outputs a high voltage HV which is compared with a reference voltage Vref after sampled, to obtain an error signal. A control signal u is generated through a PID controller. A PWM comparator compares the u with a sawtooth wave with a fixed frequency (a specific value is related to a system using the HV circuit), and outputs a group of control pulses to control a connection state of a power switch, so as to maintain the relative stability of the output voltage. From the perspective of the circuit structure, there are relatively many components in the whole circuit. In addition, because the operating process requires negative feedback, a switching speed of the HV is also relatively slow. FIG. 9B is a simulation diagram of operating by using the power supply in FIG. 9A to supply HV. Compared FIG. 9B with FIG. 10B, it takes 0.9 ms=1.9 ms−1 ms to output the high voltage HV1 of 30 V in FIG. 9B, but it takes less than 0.2 μs≈0.8 μs−0.6 μs to output the high voltage HV1 of 30 V in FIG. 10B. The speed is increased by a thousand times. Therefore, with the power supply unit 11 in this application, the HV can be output quickly, and the HV can also be switched quickly, so that the light intensity of a plurality of laser emitters of the lidar can be adjusted more quickly to match with an external obstacle situation or a scenario of use, thereby improving accuracy of point cloud detection.

Third Aspect

FIG. 18 shows an embodiment of a driving apparatus 100 of a lidar with four fast buses. The driving apparatus 100 includes four buses, that is, HVBUSA, HVBUSB, HVBUSC and HVBUSD. Two laser emitters are mounted on each bus. Laser emitter LAS1 and laser emitter LAS2 are mounted on the bus HVBUSA. Laser emitter LAS3 and laser emitter LAS4 are mounted on the bus HVBUSB. Laser emitter LAS5 and laser emitter LAS6 are mounted on the bus HVBUSC. Laser emitter LAS7 and laser emitter LAS8 are mounted on the bus HVBUSD. The four laser emitters mounted on different buses share a GaN switching device. Cathodes of the laser emitter LAS1, laser emitter LAS3, laser emitter LAS5, and laser emitter LAS7 are jointly coupled to the GaN switching device GaN1. Cathodes of the laser emitter LAS2, laser emitter LAS4, laser emitter LAS6, and laser emitter LAS8 are jointly coupled to the GaN switching device GaN2. Through activating of the GaN switching devices GaN1 and GaN2, the corresponding laser emitter emits light. Each fast bus includes an energy storage unit, as the capacitors C1-C4 shown in the figure. The energy storage unit on the bus HVBUSA is the C1, the energy storage unit on the bus HVBUSB is the C2, the energy storage unit on the bus HVBUSC_E is the C3, and the energy storage unit on the bus HVBUSD is the C4.

A switching loss and a charge loss generated by a multi-bus driving apparatus in the operating process are further described below with an embodiment of a four-bus driving apparatus.

As shown in FIG. 18, it may be assumed that in detection, a plurality of laser emitters of the lidar do not emit light in parallel. In other words, part of the plurality of laser emitters can emit light in parallel, but not all of them emit light at the same time. In this embodiment, an example in which the laser emitters emit light one by one is introduced. The GaN switching device GaN1 is closed, the bus HVBUSA outputs a high voltage to charge the C1, and then discharges through the energy storage unit C1, so that the laser emitter LAS1 mounted on the bus HVBUSA emits a laser pulse. After the laser emitter LAS1 completes operating, the bus HVBUSA is switched to the bus HVBUSB. The GaN switching device GaN1 is closed again. At this time, the bus HVBUSB outputs the high voltage to charge the C3, and the laser emitter LAS3 mounted on the bus HVBUSB emits the laser pulse through discharging of the energy storage unit C3. Before the GaN switching device GaN1 is closed again, it is necessary to empty the remaining energy in the energy storage unit C1 on the bus HVBUSA. Otherwise, after the GaN switching device GaN1 is closed again, the laser emitter LAS1 emits the laser pulse again, which affects the detection of the laser emitter LAS3. Moreover, the one-by-one activating of the laser emitters is also affected. In detail, the laser emitter LAS1 emits the laser pulse again through the remaining energy on the energy storage unit C1. Although the pulse energy is less than pulse energy emitted by the laser emitter LAS1 during detection, serious interference is still caused to the detection of the laser emitter LAS3. Therefore, the remaining energy in the energy storage unit on the last operating bus may be emptied in each switching. Because a quantity of electricity stored in the capacitor meets $Q=0.5\ CV^2$, a total loss generated by the switching of the bus is:

$$\text{switching loss}=0.5 f_{bus} CV^2 \qquad \text{Formula 1,}$$

where $f_{bus}$ is a bus switching frequency, C is a capacitance value of the energy storage unit, and V is a voltage on the energy storage unit. V is approximately considered to be an output voltage of the bus, and is approximately HV.

Therefore, to reduce the switching loss, the output voltage of the bus needs to be set to be relatively low and the capacitance value of the energy storage unit needs to be set to be relatively small. However, reducing the capacitance value of the energy storage unit causes an increase in the charge loss on the bus. The charge loss generated by a multi-bus apparatus in the operating process is described below.

As shown in FIG. 18, it may be assumed that the plurality of laser emitters of the lidar emit light one by one (in other embodiments, the laser emitters may not emit light at the same time, that is, a subnet of the plurality of laser emitters emit light at the same time), and emit three laser pulses in each (one detection refers to obtaining a distance value of one point of the external obstacle) detection. The GaN switching device GaN1 is closed, and is provided with energy through the energy storage unit C1. The laser emitter LAS1 mounted on the bus HVBUSA emits the first laser pulse. After that, the energy storage unit C1 provides energy for the laser emitter LAS1 again, and the laser emitter LAS1 emits the second laser pulse . . . . Suppose that the voltage on the energy storage unit C1 after charged is V, and the voltage on the energy storage unit C1 after discharged (corresponding to emitting a single pulse) is V', a voltage drop during each discharge process is ΔV=V−V'. FIG. 19 shows a change of the voltage on the energy storage unit C1 during the discharge-charge process: Before discharge, the voltage on the energy storage unit C1 is V. The discharge process starts at the time t1 to provide energy for the laser emitter to emit pulse. The discharge process ends at the time t2. After the discharge process, the voltage on the energy storage unit C1 is V'. In an embodiment of the present disclosure, the energy storage unit can be charged from the time t2. After the charging is completed, the voltage on the energy storage unit C1 reaches V again or is close to V. In another embodiment of the present disclosure, the energy storage unit C1 completes the power supply at the time t3. That is, the electricity on the energy storage unit C1 is discharged, and then the energy storage unit C1 is recharged. It is easy for a person skilled in the art to understand that the voltage reached by recharging the energy storage unit C1 may be adjusted according to the detection demand, and may be the same as or different from the voltage V required for the last detection.

The present disclosure uses a double-edge charge solution, and the charge loss generated under the charge solution is calculated below.

It is advisable to suppose that the energy of emitting the laser pulse in one detection is ΔE, and photoelectric conversion efficiency is PCE. An energy difference is calculated according to the voltage drop of the energy storage unit C1 before and after the discharge:

$$0.5CV^2 - 0.5CV'^2 = CV\Delta V - 0.5C\Delta V^2 = \frac{\Delta E}{PCE} \quad \text{Formula 2}$$

In a case that ΔE/PCE is set, the calculated ΔV is inversely proportional to the capacitance value C of the energy storage unit.

The energy storage unit C1 is charged through the bus HVBUSA. After the charging is completed, the voltage on the energy storage unit C1 reaches V again. The charge is usually completed through an RC loop. Therefore, the charge loss of the bus is mainly determined by the discharge depth. That is:

$$_{charge\ loss=}\int I^2(t)Rdt = \int\left(\frac{\Delta V}{R}e^{-\frac{t}{RC}}\right)^2 Rdt = 0.5C\Delta V^2, \quad \text{Formula 3}$$

where R is equivalent resistance of the first switch Q1/Q2/Q3/Q4 shown in FIG. 18, and I is a current flowing through it. According to Formula 2, it is known from the foregoing analysis that the discharge depth ΔV is inversely proportional to the capacitance value C of the energy storage unit. According to Formula 3, it may be learned that the charge loss of the bus is inversely proportional to the capacitance value C of the energy storage unit.

In summary, the switching loss and the charge loss generated by the multi-bus driving apparatus in the operating process are:

$$\text{total loss}=0.5f_{bus}CV^2+0.5f_{pulse}C\Delta V^2 \quad \text{Formula 4,}$$

where $f_{pulse}$ is a frequency of emitted laser pulse.

A 128-line mechanical rotating radar is used as an example. If there are eight HVBUS in total, horizontal angular resolution is 0.1°, a rotational speed is 20 HZ, 9 channels emit light at the same time, each point cloud has 2 pulses, light energy of each pulse is 6 ns*35 W, an output voltage of the bus is V=16 V, and photoelectric conversion efficiency is PCE=20%. $f_{bus}$ is a switching frequency of the bus and $f_{pulse}$ is a pulse frequency.

$$f_{bus} = 6*20*\left(\frac{360}{0.1}\right) = 432\text{ kHz} \quad \text{Formula 5}$$

$$f_{pulse} = f_{bus}/8*16*2 = 0.432\text{ MHz}$$

As shown in FIG. 20, the switching loss, pulse charge loss, and total loss of the multi-bus driving apparatus used for the 128-line mechanical radar in the operating process in a case of the capacitance values C of different energy storage units are solved. It can be learned from FIG. 20 that with the increase of the capacitance value C, the switching loss of the bus increases linearly and the charge loss of the pulse decreases. However, a minimum value of the sum of the two still reaches 4 W, where a black horizontal line marks a bottom value.

Since the multi-bus driving apparatus includes a plurality of capacitors, which are relatively dispersed, it is difficult to reduce the charge loss. The present disclosure provides a driving apparatus of a lidar. The remaining electricity in the energy storage unit is transferred through an energy transfer unit, thereby reducing the switching loss without changing the capacitance value and the switching frequency. Therefore, the total loss (Formula 4) almost only includes the charge loss, which is related to a capacitance parameter of the energy storage unit. The charge loss can be further reduced by increasing the capacitance value.

According to an exemplary embodiment of the present disclosure, as shown in FIG. 21, the present disclosure provides a driving apparatus 100 of a lidar, configured to drive a laser emitter. A plurality of laser emitters operate in turns. The driving apparatus 100 includes a plurality of driving units 110, such as 110-1, 110-2, . . . , **110-*n* shown in the figure, and an energy transfer unit 120**.

Each driving unit 110 includes at least one energy storage unit 111, such as 111-1, 111-2, . . . , and **111-*n* shown in FIG. 21**, configured to provide energy for the corresponding laser emitter.

As shown in FIG. 21, the driving unit 110-1 supplies power for the corresponding laser emitter LAS1 to emit light, and the provided energy is stored in the energy storage unit 111-1. The laser emitter LAS1 is discharged by the energy storage unit 111-1 during its operation. The laser emitter LAS1 emits a laser pulse, the energy in the energy storage unit 111-1 is consumed and the voltage is reduced. Before the laser emitter LAS1 emits light next time, the driving unit 110-1 receives a preparatory voltage through an external voltage source, and then generates a high voltage higher than the preparatory voltage through a high-voltage generation unit, to charge the energy storage unit 111-1, so that the energy storage unit 111-1 stores sufficient energy again for the laser emitter LAS1 to operate. If the laser emitter that emits light next time is mounted on another bus, for example, the laser emitter emitting light next time is the laser emitter LAS2, corresponding to the driving unit 110-2, the remaining energy in the energy storage unit 111-1 can be emptied to prevent the laser emitter LAS1 corresponding to the energy storage unit 111-1 from emitting light again when the laser emitter LAS2 is activated, affecting the detection operate of the lidar and making each laser emitter fail to be individually addressable.

In addition, the driving units 110-1, 110-2, . . . , and **110-*n* shown in FIG. 21 all correspond to one laser emitter. It is easy for a person skilled in the art to understand that this is an equivalent graphical method. Each laser emitter may correspond to one or more driving units 110**, thereby overcoming the defect of insufficient switching speed between a plurality of pulses emitted by a laser emitter.

The energy transfer unit 120 is coupled between two driving units **110-*n* (n is a positive integer), and is configured to, after the currently operating driving unit 110-*n* completes driving to make the laser emitter connected to the currently operating driving unit 110-*n* to emit light, transfer the remaining energy in an energy storage unit 111-*m* (m is a positive integer) of the currently operating driving unit 110-*n* to an energy storage unit 111-*m* of the next operating driving unit 110-*n*, to make the laser emitter connected to the next operating driving unit 110-*n* to emit light. It should be noted that the energy transfer unit 120 currently shown in FIG. 21 is coupled between the adjacent driving units. A person skilled in the art can understand that this is just an example. In actual implementation, the energy transfer unit 120 can be connected between the driving units that are not physically directly adjacent, as long as there is a time sequence of light emission of the laser emitters connected by the energy transfer unit 120**.

As described above, after the laser emitter 1 completes the detection operate, the driving unit 110-1 is switched to the driving unit 110-2. At this time, the remaining energy in the energy storage unit can be emptied. In the present disclosure, the remaining energy in the energy storage unit is transferred to the energy storage unit 111-2 through the energy transfer unit 120 coupled between the driving unit 110-1 and the driving units 110-2. Based on the remaining energy transferred to the energy storage unit 111-2, the driving unit 110-2 charges the energy storage unit 111-2 through the external voltage source, so that the energy storage unit 111-2 stores sufficient energy for the laser emitter LAS2 to operate. The laser emitter LAS2 is discharged by the energy storage unit 111-2 during its operation. The laser emitter LAS2 emits the laser pulse.

It is easy for a person skilled in the art to understand that the energy transfer unit 120 in the present disclosure is coupled between two driving units 110. A specific position of the energy transfer unit 120 is determined by an operating sequence of a plurality of driving units 110, so that the energy transfer unit 120 can transfer the remaining energy according to the operating sequence of the plurality of driving units 110. An arrangement mode of the energy transfer unit 120 is not limited to the situation shown in FIG. 21.

The multi-bus driving apparatus for a lidar provided in the present disclosure transfers the remaining energy in the energy storage unit corresponding to the currently operating laser emitter through the energy transfer unit, which avoids the switching loss caused by emptying the remaining energy in the energy storage unit. In addition, the transferred remaining energy is used by the energy storage unit corresponding to the next operating laser emitter, thereby further reducing the power consumption.

According to an exemplary embodiment of the present disclosure, as shown in FIG. 22, the present disclosure provides a four-bus driving apparatus for a lidar, where the lidar includes a plurality of laser emitters, the plurality of laser emitters emit light in turns, and an anode of each laser emitter is connected to an output end of one of a plurality of driving units. FIG. 22 shows that the anode of each laser emitter is connected to one of a plurality of buses. The lidar further includes an energy transfer unit 120 and a GaN switching device, where the energy transfer unit 120 is connected between capacitors C1 and C2, and configured to transfer the remaining energy in an energy storage unit C1/C2 to an energy storage unit C2/C1. It should be noted that FIG. 22 is only an example, which only directly shows an equivalent diagram of the energy transfer unit 120 connected between the capacitors C1 and C2 and in an operating state (directly connected to the capacitors C1 and C2). In fact, one or more switches can also be arranged on a circuit where the energy transfer unit 120 is connected between the capacitors C1 and C2, to control whether the energy transfer unit 120 is operating and how long it is in the operating state. In addition, a person skilled in the art can understand that the similar energy transfer unit 120 may also be connected between other HVBUS buses.

For the GaN switching device, the cathodes of the laser emitters that do not share the driving unit are connected to one GaN switching device, which is configured to conduct or switching off a current loop formed by the corresponding driving unit, the laser emitter connected to the GaN switching device, and the ground, so as to make the laser emitter emit light or not emit light.

As shown in FIG. 22, a plurality of laser emitters LAS1-LAS8 of the lidar emit light in turns (not representing a specific time sequence of light emission, but indicating that not all eight laser emitters emit light at the same time). If the laser emitter LAS1 emits light first, and the laser emitter LAS2 emits light later, it is advisable to suppose that the GaN switching device GaN1 is closed, and the energy storage unit C1 is charged. Energy is provided for the laser emitter through the energy storage unit C1. The laser emitter LAS1 mounted on the bus HVBUSA emits the laser pulse. After the laser emitter LAS1 completes operating, the bus HVBUSA is switched to the bus HVBUSB. The energy transfer unit 120 transfers the remaining energy in the energy storage unit C1 to the energy storage unit C2. Later, similarly, the laser emitter LAS2 emits the laser pulse by undergoing the charge-discharge process of the corresponding capacitor.

According to an exemplary embodiment of the present disclosure, in the multi-bus driving apparatus for a lidar, the driving unit further includes:

an external voltage source, configured to charge the energy storage unit.

As shown in FIG. 22, a plurality of driving units receive a preparatory voltage through the external voltage source HV, then generate a high voltage higher than the preparatory voltage through a high-voltage generation unit (not shown in the figure), and cause the energy storage unit to be charged with the high voltage.

The energy storage unit includes a capacitor, coupled between the external voltage source and the ground, and configured to discharge to a laser emitter on the activated current loop when the corresponding GaN switching device is closed, to drive the laser emitter to emit a single pulse.

As shown in FIG. 22, the energy storage unit includes the capacitor. The energy storage units on the buses HVBUSA, HVBUSB, HVBUSC, and HVBUSD are capacitors C1, C2, C3, and C4 respectively. The capacitors C1, C2, C3, and C4 are charged through the external voltage source HV, and discharge to the laser emitter on the activated current loop when the corresponding GaN switching device is closed.

According to an exemplary embodiment of the present disclosure, as shown in FIG. 23, in the multi-bus driving apparatus for a lidar, the energy transfer unit includes:

an inductor L, coupled between an output end of the currently operating driving unit and an output end of the next operating driving unit; and switching assemblies K1 and K2, connected in series to the inductor L, and configured to form resonance between the inductor L and the capacitor of the energy storage unit when the switching assemblies K1 and K2 are connected.

The inductor L shown in FIG. 23 is coupled between the bus HV1 and the bus HV2. Each bus corresponds to one driving unit, and each driving unit includes at least one energy storage unit. For example, the energy storage unit corresponding to the bus HV1 is the capacitor C1, and the energy storage unit corresponding to the bus HV2 is the capacitor C2. If the laser emitter mounted on the bus HV1 operates first, the bus HV1 outputs the high voltage to charge the energy storage unit C1, and the energy storage unit C1 provides the energy required for the laser emitter mounted on the bus HV1 to emit light. After the laser emitter mounted on the bus HV1 completes emitting light, the energy on the energy storage unit C1 is consumed, and the energy storage unit C1 may still have a large amount of remaining energy. At this time, the switching assemblies K1 and K2 are connected, and the resonance is formed between the inductor L and the capacitors C1 and C2. The remaining energy stored in the capacitor C1 is transferred to the capacitor C2. After the transfer of the energy is completed, the switching assemblies K1 and K2 are disconnected. The laser emitter mounted on the bus HV2 will operate. The high voltage may be output by the bus HV2. Based on the transferred remaining energy, the energy storage unit C2 is charged by the bus HV2 to reach an energy value required for the laser emitter mounted on the bus HV2 to emit light. Or, after receiving the remaining energy from the capacitor C1, the capacitor C2 can directly support the energy of the laser emitter to emit light at that time. At this time, it is not necessary to be charged additionally by the HV2.

According to an exemplary embodiment of the present disclosure, a conduction period of the switching assemblies K1 and K2 is determined according to a resonance period of the resonant circuit, so that during the conduction period of the switching assemblies K1 and K2, all the remaining energy in the energy storage unit of the currently operating driving unit is transferred to the energy storage unit of the next operating driving unit.

After the switching assemblies K1 and K2 are connected, the capacitor C1, the capacitor C2 and the inductor L form a resonant circuit. Within a period of $t=\pi\sqrt{(C1+C2)L}$, the transfer of the remaining energy is completed. All the electricity on the capacitor C1 is transferred to the capacitor C2. The voltage on the capacitor C1 decreases and the voltage on the capacitor C2 increases. At this time, the switching assemblies K1 and K2 are disconnected to prevent the electricity on the capacitor C2 from returning to the capacitor C1 through the resonant circuit. Since the current on the inductor L is close to zero when the switching assemblies K1 and K2 are connected/disconnected, there is almost no distribution parameter loss on the switching assemblies K1 and K2. Preferably, by controlling internal resistance of the inductor L and the switching assemblies K1 and K2, transfer efficiency of the remaining energy can reach more than 90%.

For example, suppose that the currently operating laser emitter is mounted on the bus HVBUS1, after the laser emitter completes emitting light, the remaining energy of the energy storage unit C1 on the HVBUS1 is 20. The next operating laser emitter is mounted on the bus HVBUS2. Before the next operating laser emitter emits light, the remaining energy of the energy storage unit C1 is transferred to the energy storage unit C2 through the inductor L. Suppose that conversion efficiency of the resonant circuit is 90%, initial energy on the energy storage unit C2 is 18 after the transfer of the energy is completed. Suppose that the energy required for the two laser emitters operating successively to emit light is the same, it is sufficient to supplement energy 2 to the energy storage unit C2 through the HVBUS2. In the conventional HVBUS multi-bus solution, the remaining energy of the energy storage unit C1 on the HVBUS1 needs to be completely emptied after the currently operating laser emitter has finished emitting light, which results in a huge loss.

In the present disclosure, the switching loss completely depends on the conversion efficiency of the resonant circuit, but is not positive correlation with the capacitance value of the energy storage unit.

In other words, the capacitance value is no longer a limiting factor for the switching loss during the operating process of the multi-bus driving apparatus. Further, the charge loss during the operating process of the multi-bus driving apparatus can be reduced by using a capacitor with a large capacitance value as the energy storage unit. In the foregoing examples, in the total loss of the multi-bus driving apparatus of the 128-line lidar, if a capacitor of 200 nf is selected, the total loss is reduced to 0.4+3.8*0.1=0.78 W.

According to an exemplary embodiment of the present disclosure, as shown in FIG. 24, the inductor L is coupled between the bus HV1 and the bus HV2. The bus HV1 and the bus HV2 correspond to a driving unit respectively, and each driving unit includes at least one energy storage unit. The energy storage unit on the bus HV1 is the capacitor C1, and the energy storage unit on the bus HV2 is the capacitor C2. The switching in two directions, that is, switching from the bus HV1 to the bus HV2, or from the bus HV2 to the bus HV1, shares one switching assembly. The switching assembly is connected in series to the inductor L, and configured to form resonance between the inductor L and the capacitors C1 and C2 of the energy storage unit when the switching assembly is connected.

As shown in FIG. 24, when the NMOS switches Q1 and Q4 are connected, gates of the PMOS switches Q2, Q3, Q5, and Q6 are pulled down, thereby achieving bidirectional conduction. When the NMOS switches Q1 and Q4 are turned off, the gates of the PMOS switches Q2, Q3, Q5, and Q6 are reset by resistance, and therefore turned off.

When the laser emitter mounted on the bus HV1 operates first, the bus HV1 outputs the high voltage to charge the energy storage unit C1, and the energy storage unit C1 provides the energy required for the laser emitter mounted on the bus HV1 to emit light. After the laser emitter mounted on the bus HV1 completes emitting light, the energy on the energy storage unit C1 is consumed, but the energy storage unit C1 still has a large amount of remaining energy. The energy on the energy storage unit C2 is zero. At this time, the NMOS switches Q1 and Q4 are connected, and the gates of the PMOS switches Q2, Q3, Q5, and Q6 are pulled down, thereby conducting the resonant circuit. The resonance is formed between the inductor L and the capacitors C1 and C2, Transferring the remaining energy stored in the capacitor C1 to the capacitor C2. After the transfer of the energy is completed, the NMOS switches Q1 and Q4 are turned off, and the gates of the PMOS switches Q2, Q3, Q5, and Q6 are reset by resistance, and therefore turned off. The laser emitter mounted on the bus HV2 operates. The bus HV2 outputs the high voltage. Based on the transferred remaining energy, the energy storage unit C2 is charged by the bus HV2 to reach the energy value required for the laser emitter mounted on the bus HV2 to emit light When the laser emitter mounted on the bus HV2 operates first, the bus HV2 outputs the high voltage to charge the energy storage unit C2, and the energy storage unit C2 provides the energy required for the laser emitter mounted on the bus HV2 to emit light. After the laser emitter mounted on the bus HV2 completes emitting light, the energy on the energy storage unit C2 is consumed, but the energy storage unit C2 still has a large amount of remaining energy. The energy on the energy storage unit C1 is zero. At this time, the NMOS switches Q1 and Q4 are connected, and the gates of the PMOS switches Q2, Q3, Q5 and Q6 are pulled down, thereby conducting the resonant circuit. The resonance is formed between the inductor L and the capacitors C1 and C2, transferring the remaining energy stored in the capacitor C2 to the capacitor C1. After the transfer of the energy is completed, the NMOS switches Q1 and Q4 are turned off, and the gates of the PMOS switches Q2, Q3, Q5 and Q6 are reset by resistance, and therefore turned off. The laser emitter mounted on the bus HV1 operates. The bus HV1 outputs the high voltage. Based on the transferred remaining energy, the energy storage unit C1 is charged by the bus HV1 to reach the energy value required for the laser emitter mounted on the bus HV1 to emit light This embodiment provides an energy transfer unit of bidirectional conduction. The direction and order of activating can match with the time sequence of light emission of the laser emitters. For example, in a detection period, the laser emitter mounted on the bus HV1 emits light first, and the laser emitter mounted on the bus HV2 emits light later. In another detection period, the laser emitter mounted on the bus HV2 emits light first, and the laser emitter mounted on the bus HV1 emits light later. In the multi-line lidar, a plurality of laser emitters emit light in turns. In other words, all the laser emitters of the lidar do not emit light at the same time. The opposite of turns is that all the laser emitters emit light at the same time, and the laser emitters that emit light in adjacent time sequences are physically separated from each other as far as possible to reduce crosstalk.

According to an exemplary embodiment of the present disclosure, as shown in FIG. 25, the energy transfer unit further includes:

- a diode, configured to be connected in series to the inductor and the switching assembly, where a conduction direction of the diode is determined according to the operating sequence of the two driving units, that is, to coordinate with the time sequence of light emission of the laser emitters.

As shown in FIG. 25, the energy transfer unit further includes a diode SD and a bidirectional analog switching SW. The inductor L is coupled between the bus HV1 and the bus HV2. Each bus corresponds to a driving unit, and each driving unit includes at least one energy storage unit. For example, the energy storage unit on the bus HV1 is the capacitor C1, and the energy storage unit on the bus HV2 is the capacitor C2. The laser emitter mounted on the bus HV1 operates first. The bus HV1 outputs the high voltage to charge the energy storage unit C1, and the energy storage unit C1 provides the energy required for the laser emitter mounted on the bus HV1 to emit light. After the laser emitter mounted on the bus HV1 completes emitting light, the energy on the energy storage unit C1 is consumed, but the energy storage unit C1 still has a large amount of remaining energy. At this time, the bidirectional analog switching SW is closed. The resonance is formed between the inductor L and the capacitors C1 and C2. The remaining energy stored in the capacitor C1 is transferred to the capacitor C2. After the transfer of the energy is completed, the bidirectional analog switching SW is disconnected. The laser emitter mounted on the bus HV2 operates. The bus HV2 outputs the high voltage. Based on the transferred remaining energy, the energy storage unit C2 is charged by the bus HV2 to reach the energy value required for the laser emitter mounted on the bus HV2 to emit light If the laser emitter mounted on the bus HV2 operates first, the bus HV2 outputs the high voltage to charge the energy storage unit C2, and the energy storage unit C2 provides the energy required for the laser emitter mounted on the bus HV2 to emit light. After the laser emitter mounted on the bus HV2 completes emitting light, the energy on the energy storage unit C2 is consumed, but the energy storage unit C2 still has a large amount of remaining energy. At this time, even if the bidirectional analog switching SW is closed, due to unidirectionality of the diode SD, the resonance cannot be formed between the inductor L and the capacitors C1 and C2, thus the remaining energy stored in the capacitor C2 cannot be transferred to the capacitor C1.

This embodiment provides an energy transfer unit of unidirectional conduction. The conduction direction matches with the operating sequence of the laser emitters. For example, in each detection period, the laser emitter mounted on the bus HV1 emits light first, and the laser emitter mounted on the bus HV2 emits light later. This embodiment is applicable to a time sequence of light emission of a plurality of laser emitters of a lidar being a loop, and also applicable to a lidar in which a plurality of laser emitters are grouped, the laser emitters in each group emit light at the same time, and the detection is performed group by group.

According to an exemplary embodiment of the present disclosure, as shown in FIG. 26, the driving apparatus includes two energy transfer units, where

- each energy transfer unit includes a diode and a switching assembly, respectively connected in series to the inductor, coupled between two driving units, and configured to transfer the remaining energy from opposite directions respectively.

As shown in FIG. 26, an energy transfer unit 120-1 includes a diode SD-1 and a switching assembly SW-1, and an energy transfer unit 120-2 includes a diode SD-2 and a switching assembly SW-2, which are respectively connected in series to the inductor L and coupled between the bus HV1 and the bus HV2. Each bus corresponds to one driving unit, and each driving unit includes at least one energy storage unit. For example, the energy storage unit on the bus HV1 is the capacitor C1, and the energy storage unit on the bus HV2 is the capacitor C2. The laser emitter mounted on the bus HV1 operates first. The bus HV1 outputs the high voltage to charge the energy storage unit C1, and the energy storage unit C1 provides the energy required for the laser emitter mounted on the bus HV1 to emit light. After the laser emitter mounted on the bus HV1 completes emitting light, the energy on the energy storage unit C1 is consumed, but the energy storage unit C1 still has a large amount of remaining energy. At this time, the switching assembly SW-1 is connected, and the resonance is formed between the inductor L and the capacitors C1 and C2. The remaining energy stored in the capacitor C1 is transferred to the capacitor C2. After the transfer of the energy is completed, the switching assembly SW-1 is disconnected.

After that, the laser emitter mounted on the bus HV2 operates. The bus HV2 outputs the high voltage. Based on the transferred remaining energy, the energy storage unit C2 is charged by the bus HV2 to reach the energy value required for the laser emitter mounted on the bus HV2 to emit light After the laser emitter mounted on the bus HV2 completes emitting light, the energy on the energy storage unit C2 is consumed, but the energy storage unit C2 still has a large amount of remaining energy. At this time, the switching assembly SW-2 is connected, and the resonance is formed between the inductor L and the capacitors C1 and C2. The remaining energy stored in the capacitor C2 is transferred to the capacitor C1. After the transfer of the energy is completed, the switching assembly SW-2 is disconnected. The laser emitter mounted on the bus HV1 operates again. The bus HV1 outputs the high voltage. Based on the transferred remaining energy, the energy storage unit C1 is charged by the bus HV1 to reach the energy value required for the laser emitter mounted on the bus HV1 to emit light With the two energy transfer units provided in this embodiment, each energy transfer unit can transfer the remaining energy from one direction, and can cooperate with the time sequence of light emission of the laser emitters, thereby achieving energy transfer between specific energy storage units, so as to reduce power consumption and improve energy utilization.

It is easy for a person skilled in the art to understand that the switching assemblies SW-1 and SW-2 shown in FIG. 26 are only an equivalent graphical method. When used in practical projects, one or more switching devices may be used, and a variety of switching devices such as an NMOS switch, a PMOS switch, a field effect transistor, and a digital switching may be used, which is not limited in the present disclosure.

According to an exemplary embodiment of the present disclosure, as shown in FIG. 27, in the eight-bus driving apparatus for a lidar, there are two energy transfer units between the corresponding two driving units, which are configured to transfer the remaining energy in the energy storage unit from opposite directions. The plurality of energy transfer units share the inductor.

For example, when the laser emitter mounted on the bus HV1 operates first, the energy storage unit on the bus HV1 provides energy for the laser emitter. After the laser emitter mounted on the bus HV1 completes operating, the remaining energy in the energy storage unit on the bus HV1 is transferred to the energy storage unit on the bus HV2 along a route from the diode D1 to the inductor L1 to the inductor L2 to the switching assembly K2. The conduction/disconnection period of the switching assembly K2 is determined according to the resonance period of the resonant circuit, to complete the transfer of all the remaining energy.

Based on the transferred remaining energy, the bus HV2 outputs the high voltage to charge the energy storage unit on the bus HV2. The laser emitter mounted on the bus HV2 operates, and the energy storage unit on the bus HV2 provides energy for the laser emitter. After the laser emitter mounted on the bus HV2 completes operating, the remaining energy in the energy storage unit on the bus HV2 is transferred to the energy storage unit on the bus HV3 along a route from the diode D2 to the inductor L2 to the inductor L1 to the switching assembly K3. The conduction/disconnection period of the switching assembly K3 is determined according to the resonance period of the resonant circuit, to complete the transfer of all the remaining energy.

Based on the transferred remaining energy, the bus HV3 outputs the high voltage to charge the energy storage unit on the bus HV3. The laser emitter mounted on the bus HV3 operates again, and the energy storage unit on the bus HV3 provides energy for the laser emitter. After the laser emitter mounted on the bus HV3 completes operating, the remaining energy in the energy storage unit on the bus HV3 is transferred to the energy storage unit on the bus HV4 along a route from the diode D3 to the inductor L1 to the inductor L2 to the switching assembly K4. The conduction/disconnection period of the switching assembly K4 is determined according to the resonance period of the resonant circuit, to complete the transfer of all the remaining energy.

Based on the transferred remaining energy, the bus HV4 outputs the high voltage to charge the energy storage unit on the bus HV4. The laser emitter mounted on the bus HV4 operates again, and the energy storage unit on the bus HV4 provides energy for the laser emitter. After the laser emitter mounted on the bus HV4 completes operating, the remaining energy in the energy storage unit on the bus HV4 is transferred to the energy storage unit on the bus HV5 along a route from the diode D4 to the inductor L2 to the inductor L1 to the switching assembly K5. The conduction/disconnection period of the switching assembly K5 is determined according to the resonance period of the resonant circuit, to complete the transfer of all or at least part of the remaining energy.

By analogy, the remaining energy in the energy storage unit of the bus HV5 can be transferred to the energy storage unit of the bus HV6, HV2, HV4, or HV8. The remaining energy in the energy storage unit of the bus HV6 can be transferred to the energy storage unit of the bus HV7, HV1, HV3, or HV5. The remaining energy in the energy storage unit of the bus HV7 can be transferred to the energy storage unit of the bus HV8, HV2, HV4, or HV6. The transfer direction is controlled by the conduction/disconnection time sequence of the switching assemblies, equivalent to switching the remaining energy between the energy storage units of two groups of driving units, which is determined by the order of the light emission of a plurality of laser emitters of the lidar, or the switching order of the energy transfer is matched with the time sequence of the light emission of the laser emitters. For example, the order of the light emission of a plurality of laser emitters of a lidar is as follows: One or more laser emitters mounted on the bus HV1 emit light first, then one or more laser emitters mounted on the bus HV2 emit light, and next one or more laser emitters mounted on the bus HV3 emit light . . . . The order of the light emission of a plurality of laser emitters determines the order of power supply of a plurality of driving units, thereby determining the transfer order of the remaining energy.

It is easy for a person skilled in the art to understand that the order of the light emission of a plurality of laser emitters mentioned above is only an example. In practical projects, different orders of the light emission of the laser emitters may be set. For example, one or more laser emitters mounted on the bus HV1 emit light first, then one or more laser emitters mounted on the bus HV2 emit light, and next one or more laser emitters mounted on the bus HV5 emit light . . . . The operating sequence of the buses is set according to the order of the light emission of the laser emitters. For example, the bus HV1 operates first, then the bus HV2 operates, and next the bus HV5 operates . . . . Subsequently, the transfer order of the remaining energy is set according to the operating sequence of the buses, and the transfer order is implemented by setting the conduction/disconnection period of the switching assemblies.

In this embodiment, two energy transfer units are arranged between the corresponding two driving units, the remaining energy in the energy storage unit is transferred from opposite directions, and the plurality of energy transfer units share the inductor, which achieves the switching of the remaining energy between the two groups of driving units, thereby ensuring the time sequence of the light emission of the plurality of laser emitters of the lidar, and reducing the switching loss.

The multi-bus driving apparatus for a lidar provided in the present disclosure can effectively reduce the switching loss of the multi-bus driving apparatus in the operating process. Since the switching frequency of the bus is far lower than the pulse frequency, the energy transfer unit may be arranged outside an emitting circuit board to reduce the wiring burden of the emitting circuit board.

According to an exemplary embodiment of the present disclosure, in the multi-bus driving apparatus for a lidar, the plurality of driving units output the same or different driving voltages, and the remaining energy includes: the remaining electricity in the energy storage unit after the laser emitter corresponding to the driving unit emits a laser pulse.

According to an exemplary embodiment of the present disclosure, the present disclosure further provides a method for driving a lidar by using the driving apparatus as described above, including step S101 and step S102.

Step S101: Provide energy for the current laser emitter that emits light through the energy storage unit.

A driving unit supplies power for the corresponding laser emitter to emit light, and the provided energy is stored in the energy storage unit. The laser emitter is discharged by the energy storage unit during its operation. The laser emitter emits a laser pulse. The energy in the energy storage unit is consumed and the voltage is reduced. Before the laser emitter emits light next time, the driving unit receives a preparatory voltage through an external voltage source, and then generates a high voltage higher than the preparatory voltage through a high-voltage generation unit, to charge the energy storage unit, so that the energy storage unit stores sufficient energy again for the laser emitter to operate. If the laser emitter that emits light next time is on another bus, and corresponds to another driving unit, the remaining energy in the energy storage unit can be emptied to prevent the laser emitter corresponding to the energy storage unit from emitting light again when another laser emitter is activated, which affects the implementation of the detection operate of the lidar or the activating function of a single laser emitter.

Step S102: Transfer the remaining energy in the energy storage unit to the energy storage unit corresponding to the next laser emitter that emits light through the energy transfer unit after the current laser emitter that emits light completes operate.

After the currently operating laser emitter that completes the detection operate, the current driving unit that supplies power is switched to the next driving unit that supplies power, to empty the remaining energy in the energy storage unit. In the present disclosure, the remaining energy in the energy storage unit of the driving unit that completes power supply is transferred to the energy storage unit of the next driving unit that supplies power through the energy transfer unit coupled between two driving units. Based on the transferred remaining energy, the next driving unit that supplies power receives the preparatory voltage through the external voltage source, and the high-voltage generation unit generates the high voltage higher than the preparatory voltage to charge the energy storage unit thereof, so that the energy storage unit thereof stores sufficient energy for the next operating laser emitter to emit light. The laser emitter is discharged by the corresponding energy storage unit during its operation to emit the laser pulse.

According to an exemplary embodiment of the present disclosure, two energy transfer units are coupled between the two driving units. The method further includes:

transferring the remaining energy from opposite directions through the two energy transfer units.

With the two energy transfer units provided in this embodiment, each energy transfer unit can only transfer the remaining energy from one direction. Even if one energy transfer fails, the subsequent energy transfer is not affected continuously. Moreover, the use of the two energy transfer units effectively reduces a probability of circuit failure. In addition, by arranging the two energy transfer units between the two groups of driving units, the remaining energy can be switched between the two groups of driving units in coordination with a time sequence of light emission of the laser emitters, which ensures the time sequence of light emission of a plurality of laser emitters of the lidar, and reduces a switching loss.

According to an exemplary embodiment of the present disclosure, the lidar includes n laser emitters, where $n \geq 32$, and the plurality of laser emitters emit light one by one. The driving method further includes:

operating by the plurality of driving units one by one, to provide energy for the plurality of laser emitters; and successively transferring the remaining energy between the plurality of driving units through the energy transfer unit.

In this embodiment, the plurality of laser emitters of the lidar emit light one by one for detection. That is, the time sequence of light emission of the plurality of laser emitters of the lidar is a loop. The remaining energy is successively transferred between the plurality of driving units through the energy transfer unit, so as to implement a time sequence of power supply corresponding to the plurality of driving units.

According to an exemplary embodiment of the present disclosure, the plurality of laser emitters emit light in groups, where each group includes at least one laser emitter. The driving method further includes:

operating in groups by the plurality of driving units, to provide energy for the plurality of laser emitters; and transferring the remaining energy in the energy storage unit to the energy storage unit corresponding to any one of the plurality of laser emitters that emit light in the next group through the energy transfer unit after the current laser emitter that emits light completes operating.

For example, the plurality of laser emitters mounted on buses HV1 and HV3 first emit light, and then the plurality of laser emitters mounted on buses HV8 and HV13 emit light. After the detection of the plurality of laser emitters mounted on the buses HV1 and HV3 is completed, the remaining energy in the energy storage unit on the bus HV1 can be transferred to the energy storage unit on the bus HV8 through the energy transfer unit, or, the remaining energy in the energy storage unit on the bus HV1 can be transferred to the energy storage unit on the bus HV13 through the energy transfer unit. The transfer solution of the remaining energy in the energy storage unit on the bus HV2 can be obtained in the same way.

According to an exemplary embodiment of the present disclosure, the driving unit further includes an external voltage source, and the energy storage unit includes a capacitor, coupled between the external voltage source and the ground. The method further includes:

charging the capacitor through the external voltage source; and discharging to the laser emitter on the activated current loop through the capacitor, to drive the laser emitter to emit a single pulse.

According to an exemplary embodiment of the present disclosure, the energy transfer unit includes an inductor and a switching assembly connected in series, and is coupled between output ends of the two driving units. The method further includes:

forming resonance by the inductor and the capacitor when the switching assembly is connected.

An exemplary embodiment of the present disclosure provides a driving apparatus for a lidar. The remaining energy in the energy storage unit corresponding to the currently operating laser emitter is transferred through the energy transfer unit, which avoids the switching loss caused by emptying the remaining energy in the energy storage unit. In addition, the transferred remaining energy is used by the energy storage unit corresponding to the next operating laser emitter, thereby further reducing the power consumption.

The exemplary embodiment of the present disclosure reduces the switching loss without changing the capacitance value and the switching frequency. Therefore, the total loss in the bus driving apparatus almost only includes the charge loss, which is related to a capacitance parameter of the energy storage unit. The charge loss can be further reduced by increasing the capacitance value.

Finally, it should be noted that: the foregoing descriptions are merely exemplary embodiments of the present disclosure, but are not intended to limit the present disclosure. Although the present disclosure has been described in detail with reference to the foregoing embodiments, for a person skilled in the art, modifications can still be made to the technical solutions recorded in the foregoing embodiments, or equivalent replacements can be made to some technical features in the technical solutions. Any modification, equivalent replacement, or improvement made and the like within the spirit and principle of the present disclosure shall fall within the protection scope of the present disclosure.

What is claimed is:

1. A power supply unit for a laser emitter, comprising:

a preparatory voltage source, configured to output a preparatory voltage;

a high-voltage generation unit, coupled to the preparatory voltage source, and configured to receive the preparatory voltage, generate an output voltage higher than the preparatory voltage, and output the output voltage via an output end;

a capacitor unit, coupled to the output end of the high-voltage generation unit; and a reset switch, wherein the reset switch is connected between the preparatory voltage source and the capacitor unit and configured to reduce the output voltage back to the preparatory voltage, wherein the high-voltage generation unit and the capacitor unit are configured to cooperatively adjust the output voltage through charge and discharge processes, wherein the high-voltage generation unit comprises:

a first inductor, a first end of which is coupled to the preparatory voltage source, configured to receive electrical energy from the preparatory voltage source;

a first switch having a first end coupled to a second end of the first inductor and a second end connected to ground, the first switch configured to, upon switching to a connected state, connect the voltage source and the first inductor to form a charging loop, and cause the first inductor to be charged; and a second switch having a first end coupled to the second end of the first inductor and a second end coupled to the capacitor unit as the output end of the high-voltage generation unit.

2. The power supply unit according to claim 1, wherein the first switch, the second switch, and the reset switch comprise one or more of a GaN switch and a CMOS switch.

3. An emitting apparatus for a lidar, comprising:

a plurality of power supply units according to claim 1, configured to output voltages, respectively;

a laser emitter unit, comprising a plurality of laser emitters, wherein one end of each laser emitter is connected to an output end of one of the power supply units, so that at least two laser emitters are connected to the output ends of different power supply units; and at least one switching device, wherein cathodes of laser emitters that do not share a common voltage are connected to one of the at least one switching device, and the one of the at least one switching device is configured to selectively control a connection state of a current loop formed by one of the voltages, the laser emitters connected thereto, and the ground.

4. A control unit for controlling the power supply unit according to claim 1, the control unit configured to:

generate a voltage control signal according to a time sequence of emission of a laser emitters, and output the voltage control signal to control electrodes of the first switch, the second switch, and the reset switch, respectively, to control the high-voltage generation unit to output an output voltage higher than the preparatory voltage, and control the capacitor unit and the high-voltage generation unit to cooperatively adjust the output voltage through charge and discharge processes.

5. A method for controlling a laser emitter to emit light by using the power supply unit according to claim 1, comprising:

outputting the preparatory voltage by the preparatory voltage source;

generating the output voltage higher than the preparatory voltage through the high-voltage generation unit; and cooperatively adjusting the output voltage through charge and discharge processes of a capacitor unit and the high-voltage generation unit.

6. The method according to claim 5, further comprising:

receiving electrical energy from the preparatory voltage source through the first inductor;

connecting the preparatory voltage source and the first inductor to form a charging loop by closing the first switch and opening the second switch, thus charging the first inductor by the preparatory voltage source; and connecting the preparatory voltage source and the first inductor to form a discharging loop by opening the first switch and closing the second switch, thus charging the capacitor unit by the preparatory voltage source and the first inductor, which causes the output voltage to be higher than the preparatory voltage.

7. The method according to claim 5, further comprising:

by disconnecting the first switch and closing the second switch, causing the capacitor unit to discharge and causing the first inductor to receive electrical energy from the capacitor unit, which reduces the output voltage.

8. The method according to claim 5, further comprising:

reducing the output voltage back to the preparatory voltage through the reset switch.

9. An emitting apparatus for a lidar, comprising:

a plurality of power supply units configured to receive a preparatory voltage and output a high voltage, and at least two power supply units output the high voltage at different times, respectively, wherein the high voltage is a voltage higher than the preparatory voltage;

a laser emitter unit, comprising a plurality of laser emitters, the plurality of laser emitters comprising one or more subsets of laser emitters, wherein an anode of each laser emitter of a given subset of laser emitters is connected to an output end of a corresponding power supply unit of the plurality of power supply units, wherein the laser emitters of the given subset of laser emitters are connected to different power supply units of the plurality of power supply units; and at least one switching device, wherein the at least one switching device comprises a first switching device and a second switching device, the one or more subsets of laser emitters comprise a first subset of laser emitters and a second subset of laser emitters, cathodes of the first subset of laser emitters are connected to the first switching device, and cathodes of the second subset of laser emitters are connected to the second switching device, and the at least one switching device is configured to control a connection state of a current loop formed by the corresponding power supply unit, the laser emitter connected thereto, and the ground, a number of the at least one switching device is less than a number of the plurality of laser emitters.

10. The emitting apparatus according to claim 9, further comprising a plurality of voltage buses corresponding to the plurality of power supply units, wherein the voltage buses are connected to components on the corresponding power supply units, an input end of the voltage bus receives the preparatory voltage, the output end outputs a voltage higher than the preparatory voltage, and each laser emitter is connected to the output end of the corresponding power supply unit through one of the voltage buses.

11. The emitting apparatus according to claim 10, further comprising a capacitor unit, connected between the voltage bus and the ground, configured to be charged through the voltage bus, and be discharged to an activated laser emitter on the current loop when the switching device is closed, to drive the laser emitter to emit light.

12. The emitting apparatus according to claim 11, wherein the power supply unit further comprises:

a preparatory voltage source, configured to output a preparatory voltage;

a high-voltage generation unit, connected to the preparatory voltage source, wherein the preparatory voltage source is suitable for outputting the preparatory voltage to the high-voltage generation unit, and the high-voltage generation unit is configured to generate a high voltage higher than the preparatory voltage.

13. The emitting apparatus according to claim 12, wherein the high-voltage generation unit comprises:

a first inductor, a first end of which is connected to the preparatory voltage source, configured to receive electrical energy from the preparatory voltage source;

a first switch having a first end connected to a second end of the first inductor and a second end connected to ground, the first switch configured to, upon being closed, cause the preparatory voltage source and the first inductor to form a charging loop and cause the first inductor to be charged; and a second switch having a first end connected to the second end of the first inductor and a second end connected to the capacitor unit, the second switch configured to, upon being closed, cause the preparatory voltage source and the first inductor to form a discharging loop and discharge the capacitor unit.

14. The emitting apparatus according to claim 9, wherein the power supply unit further comprises a voltage control end, configured to receive a voltage control signal to control the power supply unit to output a voltage.

15. The emitting apparatus according to claim 14, wherein each switching device comprises a control end, a first end, and a second end, the first end is connected to the cathodes of the laser emitters of the corresponding subset of laser emitters, and the second end is connected to the ground; and the control end is configured to receive a driving signal to control a connection state between the first end and the second end, and the voltage control signal is cooperated with the driving signal to control the corresponding subset of laser emitters to emit light.

16. The emitting apparatus according to claim 9, wherein the plurality of laser emitters of the laser emitter unit are arranged in a plurality of arrays, each array corresponds to a subset of laser emitters of the one or more subsets of laser emitters, two laser emitter arrays are interlaced with each other, and a distance between each laser emitter and the corresponding switching device is substantially the same.

17. The emitting apparatus according to claim 9, wherein the switching device comprises one or more of a GaN switch and a CMOS switch.

18. A method for controlling the emitting apparatus according to claim 9 to emit light, comprising:

controlling a power supply unit to output a voltage; and controlling a current loop of a subset of laser emitters of the one or more subsets of laser emitters connected through a corresponding switching device of the at least one switching device, which causes a laser emitter of the respective subset of laser emitters connected to the power supply unit of the output voltage to emit light by the effect of the voltage.

19. The method according to claim 18, wherein the emitting apparatus further comprises a plurality of voltage buses corresponding to a plurality of power supply units, each voltage bus is connected to an output end of a corresponding power supply unit, each laser emitter is connected to the output end of the corresponding power supply unit through one of the voltage buses, the power supply unit comprises a capacitor unit connected to the voltage bus, and the method further comprises:

charging the capacitor unit through the voltage bus, and discharging the laser emitter connected to the same voltage bus through the capacitor unit, to drive the laser emitter to emit light.

20. The method according to claim 19, wherein the power supply unit further comprises: a preparatory voltage source and a high-voltage generation unit, and the method further comprises:

outputting a preparatory voltage by the preparatory voltage source; and generating a voltage higher than the preparatory voltage by the high-voltage generation unit, and outputting the voltage via the voltage bus.

21. The method according to claim 20, wherein the high-voltage generation unit comprises: a first inductor having a first end connected to the preparatory voltage source, a first switch having a first end connected to a second end of the first inductor and a second end connected to ground, and a second switch having a first end connected to the second end of the first inductor and a second end connected to the capacitor unit, and the method further comprises:

outputting electrical energy from the preparatory voltage source through the first inductor;

causing the preparatory voltage source and the first inductor to form a charging loop by connecting the first switch, thus charging the first inductor; and causing the preparatory voltage source and the first inductor to form a discharging loop by connecting the second switch, thus charging the capacitor unit.

22. The method according to claim 18, wherein the power supply unit further comprises a voltage control end, and the method further comprises:

receiving a voltage control signal through the voltage control end to control the power supply unit to output the voltage.

23. The method according to claim 22, wherein each switching device comprises a control end, a first end, and a second end, the control end is configured to receive a driving signal to control a connection state between the first end and the second end, the first end is connected to the cathodes of the laser emitters of the corresponding subset of laser emitters, the second end is connected to the ground, and the method further comprises:

cooperating the voltage control signal and the driving signal with each other to control the laser emitter to emit light.

24. A lidar, comprising the emitting apparatus according to claim 9, a receiving apparatus, and a control apparatus, wherein the emitting apparatus is suitable for driving laser emitters to emit a detection laser beam according to a certain time sequence under the control of the control apparatus;

the receiving apparatus is suitable for receiving an echo reflected by an external obstacle relative to the lidar; and the control apparatus is suitable for generating a voltage control signal according to a detection demand of the lidar, controlling a power supply unit to output a voltage, and generating a driving signal to activate one or more laser emitters of the plurality of laser emitters to emit light; and is suitable for processing the echo received by the receiving apparatus, and calculating a distance and/or reflectivity between the external obstacle and the lidar according to the echo that the lidar communicates with a photographing unit to receive scene information and is configured to determine an expected angular resolution along a horizontal direction for a lidar point cloud according to the scene information and adjust light emission frequency of the laser emitter.

* * * * *